(12) United States Patent
Bahar et al.

(10) Patent No.: US 11,408,082 B2
(45) Date of Patent: *Aug. 9, 2022

(54) ELECTROCHEMICAL COMPRESSION SYSTEM

(71) Applicant: Xergy Inc., Harrington, DE (US)

(72) Inventors: Bamdad Bahar, Georgetown, DE (US); Steven Naugler, Hockessin, DE (US)

(73) Assignee: FFI IONIX IP, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/682,382

(22) Filed: Aug. 21, 2017

(65) Prior Publication Data

US 2017/0350024 A1 Dec. 7, 2017

Related U.S. Application Data

(63) Continuation of application No. 13/725,515, filed on Dec. 21, 2012, now Pat. No. 9,738,981.

(Continued)

(51) Int. Cl.
*C25B 9/19* (2021.01)
*H01M 8/0271* (2016.01)
(Continued)

(52) U.S. Cl.
CPC ............... *C25B 9/19* (2021.01); *C25B 1/02* (2013.01); *H01M 8/0271* (2013.01); *H01M 8/247* (2013.01); *H01M 8/04074* (2013.01)

(58) Field of Classification Search
CPC .... C25B 1/02; C25B 9/08; C25B 1/04; C25B 9/19; C25B 13/04; H01M 8/0271;
(Continued)

(56) References Cited

U.S. PATENT DOCUMENTS

| | | | |
|---|---|---|---|
| 1,925,281 A | 9/1933 | Replogle | |
| 2,913,511 A | 11/1959 | Grubb, Jr. | |

(Continued)

FOREIGN PATENT DOCUMENTS

| | | |
|---|---|---|
| GB | 235009 A | 10/2016 |
| WO | 9106691 | 5/1991 |

(Continued)

OTHER PUBLICATIONS

"Engineering a Membrane Electrode Assembly," John W. Weidner et al., The Electrochemical Society Interface, Winter, 2003, pp. 40-43.

(Continued)

*Primary Examiner* — Ciel P Contreras
(74) *Attorney, Agent, or Firm* — Invention To Patent Services; Alex Hobson

(57) ABSTRACT

An electrochemical system includes an electrochemical compressor through which a working fluid that includes a component that primarily acts as an electrochemically-active component flows; a sealed vessel in which the electrochemical compressor is housed; an inlet conduit for passing working fluid into the vessel; and an outlet conduit for passing fluid out of the vessel. The working fluid that leaks from the electrochemical compressor is contained within the vessel.

11 Claims, 25 Drawing Sheets

Related U.S. Application Data

(60) Provisional application No. 61/630,960, filed on Dec. 21, 2011.

(51) Int. Cl.
*H01M 8/247* (2016.01)
*C25B 1/02* (2006.01)
*H01M 8/04007* (2016.01)

(58) Field of Classification Search
CPC .. H01M 8/241; H01M 8/247; H01M 8/04074; H01M 8/184; H01M 8/00; H01M 8/04; H01M 8/06; Y02E 60/50; F28D 21/00
See application file for complete search history.

(56) References Cited

U.S. PATENT DOCUMENTS

| | | | |
|---|---|---|---|
| 3,432,355 | A | 3/1969 | Niedrach et al. |
| 3,489,670 | A | 1/1970 | Maget |
| 3,544,377 | A | 12/1970 | Justi et al. |
| 4,118,299 | A | 10/1978 | Maget |
| 4,402,817 | A | 9/1983 | Maget |
| 4,523,635 | A | 6/1985 | Nishizaki et al. |
| 4,593,534 | A | 6/1986 | Bloomfield |
| 4,829,785 | A | 5/1989 | Hersey |
| 4,990,412 | A | 2/1991 | Hersey |
| 5,024,060 | A | 6/1991 | Trusch |
| 5,547,551 | A | 8/1996 | Bahar et al. |
| 5,599,614 | A | 2/1997 | Bahar et al. |
| 5,635,041 | A | 6/1997 | Bahar et al. |
| 5,746,064 | A | 5/1998 | Tsenter |
| 5,768,906 | A | 6/1998 | Tsenter |
| 5,900,031 | A | 5/1999 | Bloomfield |
| 5,961,813 | A | 10/1999 | Getermann et al. |
| 5,976,724 | A | 11/1999 | Bloomfield |
| 5,993,619 | A * | 11/1999 | Bloomfield ......... H01M 8/0612 204/278 |
| 6,068,673 | A | 5/2000 | Bloomfield |
| 6,167,721 | B1 | 1/2001 | Tsenter |
| 6,254,978 | B1 | 7/2001 | Bahar et al. |
| 6,321,561 | B1 | 11/2001 | Magel |
| 6,425,440 | B1 | 7/2002 | Tsenter et al. |
| 6,553,771 | B2 | 4/2003 | Tsenter |
| 6,635,384 | B2 | 10/2003 | Bahar et al. |
| 6,994,929 | B2 | 2/2006 | Barbir et al. |
| 8,640,492 | B2 | 2/2014 | Bahar |
| 8,769,972 | B2 | 7/2014 | Bahar |
| 9,005,411 | B2 | 4/2015 | Bahar et al. |
| 2002/0066277 | A1 | 6/2002 | Tsenter |
| 2002/0114984 | A1* | 8/2002 | Edlund ............... H01M 8/065 429/411 |
| 2003/0141200 | A1 | 7/2003 | Harada |
| 2003/0155252 | A1 | 8/2003 | Juda et al. |
| 2003/0196893 | A1 | 10/2003 | Mcelroy et al. |
| 2004/0040862 | A1 | 3/2004 | Kosek |
| 2004/0142215 | A1 | 7/2004 | Barbir et al. |
| 2004/0261398 | A1* | 12/2004 | Childs .................. C25B 1/04 60/275 |
| 2005/0072688 | A1 | 4/2005 | Meltser |
| 2005/0274138 | A1 | 12/2005 | Golden |
| 2006/0230765 | A1 | 10/2006 | Fedorov et al. |
| 2006/0254286 | A1 | 11/2006 | Johnson et al. |
| 2008/0187794 | A1 | 8/2008 | Weingaetner |
| 2009/0214905 | A1 | 8/2009 | Narayanan et al. |
| 2009/0308752 | A1 | 12/2009 | Evans et al. |
| 2010/0132386 | A1 | 6/2010 | Bahar |
| 2010/0266923 | A1* | 10/2010 | McElroy ........... H01M 8/04798 429/444 |
| 2011/0198215 | A1 | 8/2011 | Bahar |
| 2011/0256463 | A1 | 10/2011 | Michalske et al. |
| 2017/0138653 | A1 | 5/2017 | Bahar |

FOREIGN PATENT DOCUMENTS

| | | | |
|---|---|---|---|
| WO | 0125700 A1 | 4/2001 | |
| WO | 007108 A1 | 1/2008 | |
| WO | WO2008154984 A1 | 12/2008 | |
| WO | 2010127270 A2 | 4/2010 | |
| WO | WO-2010126984 A2 * | 11/2010 | ............... F25B 1/00 |
| WO | WO2010127270 A2 | 11/2010 | |
| WO | 2013096890 A1 | 6/2013 | |

OTHER PUBLICATIONS

Technical Specifications for "HOGEN Hydrogen Generation Systems," Proton Energy Systems, Inc., Oct. 2008, 2 pages.
"Teledyne Titan(TM) HM Generator Series Hydrogen/Oxygen Gas Systems," Teledyne Energy Systems, Inc., Jun. 2007, 2 pages.
"A Comparative Study of Water as a Refrigerant with Some Current Refrigerants", International Journal of Energy Research, Int. J. energy res. 2005: 29.947-959.

* cited by examiner

Example of a microprocessor cooler. Electrochemical compressor powered refrigeration module is placed in a tight fitting leak proof housing.

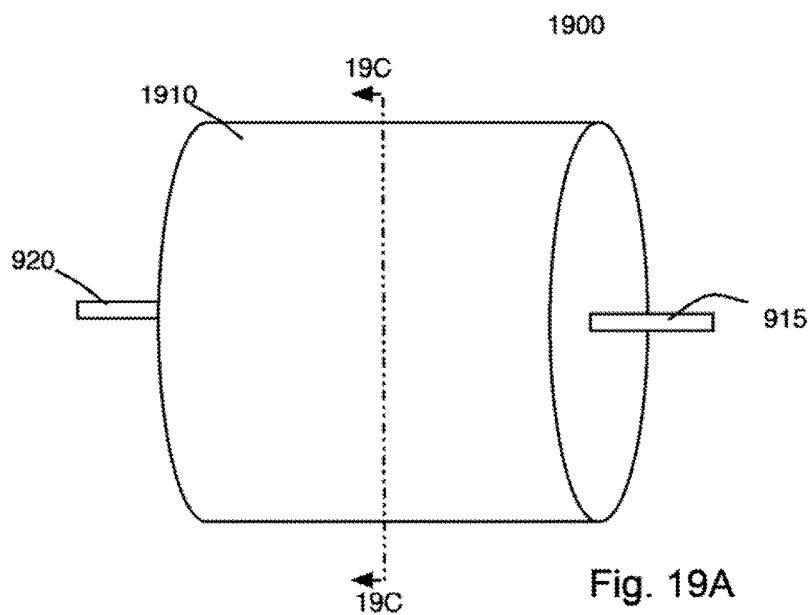
Fig. 19A
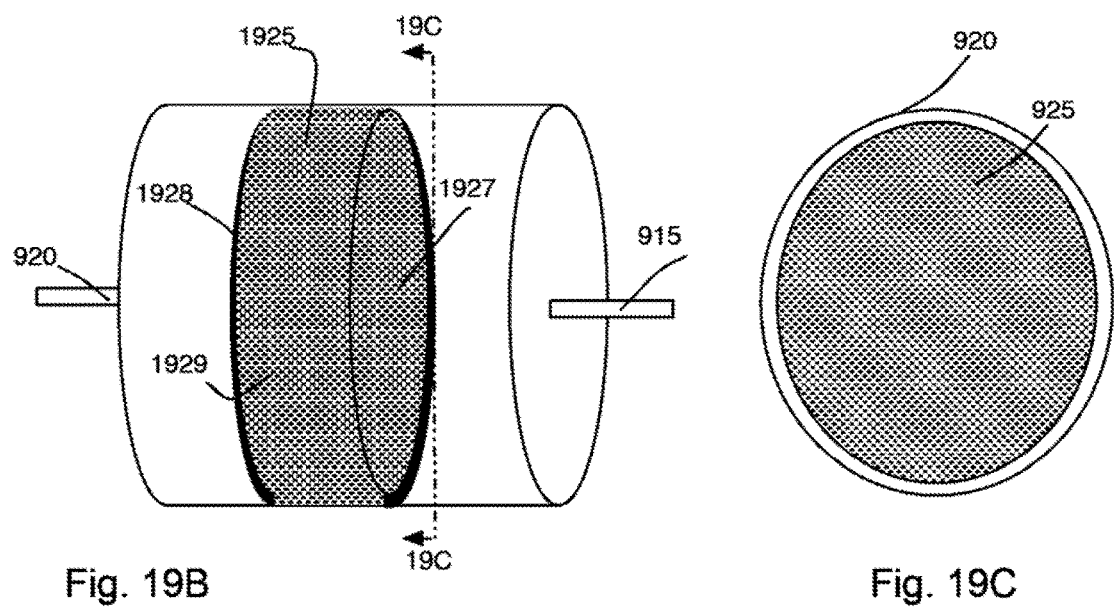
Fig. 19B
Fig. 19C

ELECTROCHEMICAL COMPRESSION SYSTEM

CROSS-REFERENCE TO RELATED APPLICATIONS

This application is a continuation of U.S. Pat. No. 9,738,981, issued on Aug. 22, 2017 and entitled, "Electrochemical Compression System," which claims priority to U.S. Application No. 61/630,960, filed on Dec. 21, 2011 and entitled, "Electrochemical Compression Systems for Refrigeration Applications," which is incorporated herein by reference in its entirety.

TECHNICAL FIELD

The disclosed subject matter relates to an electrochemical compression system having an electrochemical compressor.

BACKGROUND

An electrochemical compressor is a device that raises the pressure of a component of a working fluid using an electrochemical process.

SUMMARY

In some general aspects, an electrochemical system includes an electrochemical compressor through which a working fluid that includes a component that primarily acts as an electrochemically-active component flows; a sealed vessel in which the electrochemical compressor is housed; an inlet conduit for passing working fluid into the vessel; and an outlet conduit for passing fluid out of the vessel. The working fluid that leaks from the electrochemical compressor is contained within the vessel.

Implementations can include one or more of the following features. For example, the electrochemical compressor can include one or more electrochemical cells. Each electrochemical cell includes an anode, a cathode, and an electrolyte disposed between and in intimate electrical contact with the cathode and the anode to pass the working fluid. The electrolyte can include a solid electrolyte.

The working fluid can include one or more of water and hydrogen.

The system can also include a condenser that transfers heat from a first heat reservoir to the working fluid, an evaporator that transfers heat from the working fluid to a second heat reservoir, and an expansion device between the condenser and the evaporator that reduces pressure of the working fluid. The electrochemical compressor can be between the condenser and the evaporator.

The electrochemical compressor can include a stack of electrochemical cells, each electrochemical cell including inlet openings fluidly connected to the vessel to receive working fluid within the vessel; an anode; a cathode; an electrolyte disposed between the cathode and the anode to pass the working fluid; and outlet lines fluidly coupled to an output opening that is connected to a sealed output port of the vessel.

The system can also include a leakage flow conduit, a first end of the leakage flow conduit fluidly coupled to an interior of the vessel and a second end of the leakage flow conduit fluidly coupled to either the inlet conduit or the outlet conduit.

The outlet conduit can extend from an outlet of the electrochemical compressor through a sealed outlet opening of the vessel.

The inlet conduit can extend from an exterior of the vessel through a sealed inlet opening of the vessel and to an inlet opening of the electrochemical compressor. The inlet conduit can extend from an exterior of the vessel into the interior of the vessel.

The sealed rigid vessel can be hermetically-sealed or semi-hermetically sealed.

In other general aspects, an electrochemical compressor includes a stack of electrochemical cells that are housed within an enclosure that houses working fluid. Each electrochemical cell includes a plurality of inlet openings fluidly connected to the interior of the enclosure to receive working fluid from the enclosure interior; an anode; a cathode; an electrolyte disposed between the cathode and the anode to pass the working fluid received from the plurality of inlet openings; and outlet lines fluidly coupled to an output opening that is connected to an output port of the enclosure.

In other general aspects, an electrochemical compressor includes one or more stacks, with each stack having two electrochemical cells, and with each electrochemical cell including a first electrode, a second electrode, and a proton exchange membrane between the first and second electrodes. The first electrode of the first electrochemical cell in a particular stack is adjacent to and at the same electrical potential as the first electrode of the second electrochemical cell in the particular stack such that the pressure differential of the first electrochemical cell in the particular stack is directed opposite to the pressure differential of the second electrochemical cell in the particular stack.

In another general aspect, a method of increasing a pressure of a working fluid includes housing an electrochemical compressor within a hermetically-sealed rigid vessel; receiving a working fluid at a first pressure through an inlet of an electrochemical compressor; pumping the working fluid through an electrolyte of the electrochemical compressor using an electrical potential across electrodes of the electrochemical compressor to thereby produce the working fluid at a second pressure that is higher than the first pressure; and containing working fluid that leaks from the electrochemical compressor within the vessel.

Implementations can include one or more of the following features. For example, receiving the working fluid at the first pressure through the inlet of the electrochemical compressor can include receiving working fluid through the inlet from the contained working fluid within the vessel. Receiving working fluid at the first pressure through the inlet of the electrochemical compressor can include receiving working fluid through the inlet, which is fluidly connected through a conduit to an inlet port of the vessel.

In another general aspect, an electrochemical system includes an electrochemical compressor. The electrochemical system includes an inlet configured to receive a working fluid that includes an electrochemically active component and an outlet, a sealed vessel that defines an interior space that contains the electrochemical compressor, the sealed vessel including a first wall that defines an input opening through which the working fluid flows toward the inlet of the electrochemical compressor and a second wall that defines an output opening through which the working fluid flows away from the outlet of the electrochemical compressor, and a storage device in fluid communication with the interior space of the sealed vessel. The storage device is configured to hold the electrochemically active component of the working fluid.

Implementations can include one or more of the following features. The storage device can also be configured to release the electrochemically active component of the working fluid towards the inlet of the electrochemical compressor. The electrochemical system also can include a conduit that is received in the first opening and is fluidly coupled to the inlet, and a conduit that is received in the second opening and is fluidly coupled to the outlet. The working fluid that escapes from the electrochemical compressor without passing through the outlet of the electrochemical compressor can collect in the interior space of the sealed vessel, and the storage device can be positioned to receive the escaped working fluid. The storage device can be in fluid communication with the interior space of the sealed vessel through a conduit that passes through an opening defined by the sealed vessel. The electrochemically active component of the working fluid can be hydrogen gas. The working fluid also can include a refrigerant. The storage device can be contained in the interior space. The storage device can be outside of the interior space and fluidly connected to the interior space by a conduit that passes through an opening defined in a wall of the sealed vessel.

In another general aspect, a device includes a sorbing material including a first side, a second side, and a middle portion between the first side and the second side, an inlet that is fluidly coupled to the sorbing material at the first side, the inlet receiving a working fluid from an interior space of a sealed rigid vessel that contains an electrochemical compressor, the working fluid including an electrochemically active component and a refrigerant, and an outlet that is fluidly coupled to the sorbing material at the second surface. The sorbing material sorbs an electrochemically active component of the working fluid and is substantially unaffected by contact with the refrigerant.

Implementations can include one or more of the following features. A heater can be thermally coupled to the middle portion. The device can also include a housing that contains the sorbing material, the housing defining a first opening to receive a conduit in fluid communication with the inlet and a second opening to receive a conduit in fluid communication with the outlet, and the heater can be thermally coupled to the housing in the vicinity of the middle portion. The sorbing material can include a porous metal material. The sorbing material can be substantially solid. The sorbing material can be a mesh that defines air gaps. The sorbing material can sorb the electrochemically active component of the working fluid through the inlet in response to an increase in pressure, and the sorbing material can be further configured to release the electrochemically active component of the working fluid through the outlet in response to a decrease in pressure. The sorbing material can hold the electrochemically active component of the working fluid prior to receiving the working fluid from the interior space of the sealed rigid vessel. The electrochemically active component of the working fluid can include hydrogen, and the refrigerant includes water. The sorbing material can absorb the electrochemically active component of the working fluid. The sorbing material can adsorb the electrochemically active component of the working fluid. The sorbing material can retain the sorbed electrochemically active component of the working fluid.

Implementations of any of the techniques described above may include an assembly, an apparatus, a system, a kit for retrofitting an existing electrochemical system, or a method. The details of one or more implementations are set forth in the accompanying drawings and the description below. Other features will be apparent from the description and drawings, and from the claims.

DRAWING DESCRIPTION

FIG. 19A is a perspective view of an example storage device;

FIG. 19B is a perspective cut-away view of the storage device of FIG. 19A;

FIG. 19C is a cross-sectional view of the storage device of FIG. 19A taken along line 19C-19C;

DESCRIPTION

In an electrochemical compressor, at least one component of the working fluid must be electrochemically active. In particular, the electrochemically active component (the first component) must be ionizable. For example, the electrochemically active component is oxidizable at a gas pervious anode of the compressor and is reducible at a gas pervious cathode of the compressor.

Figure 1:
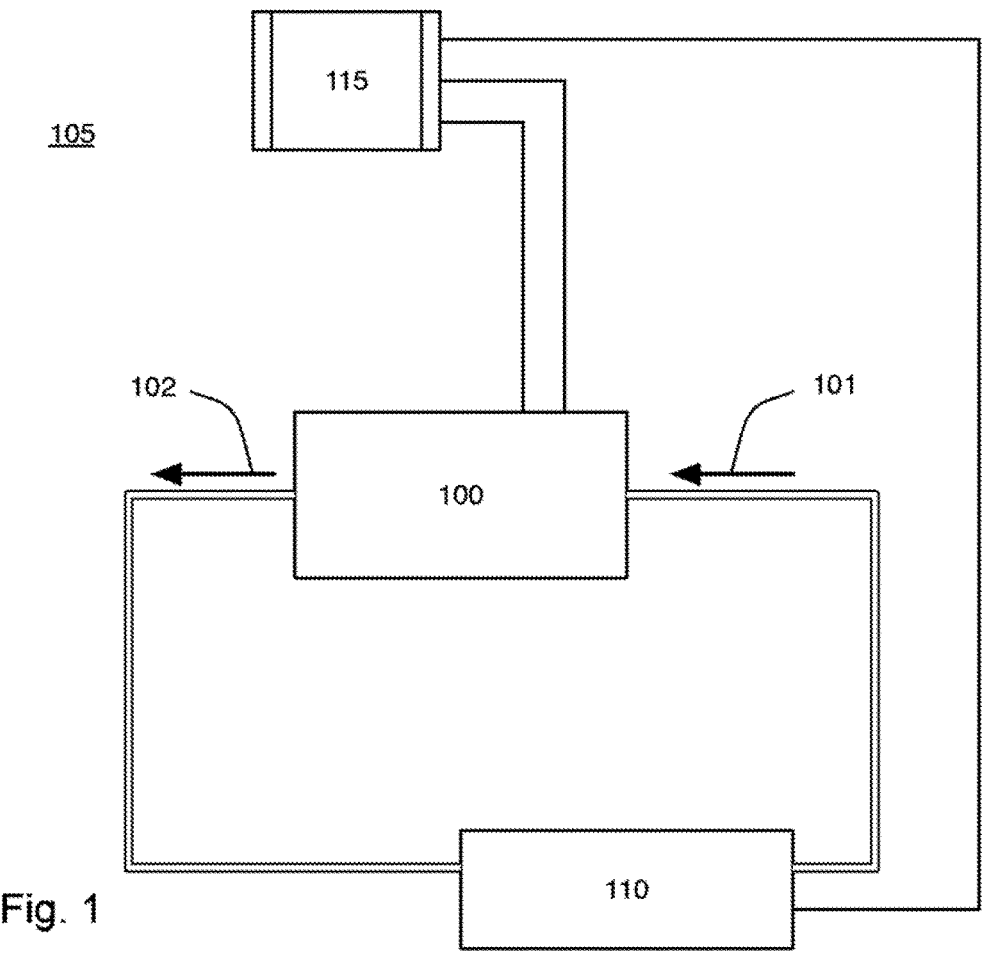
FIG. 1 is a block diagram of an electrochemical compression system.
Figure 2:
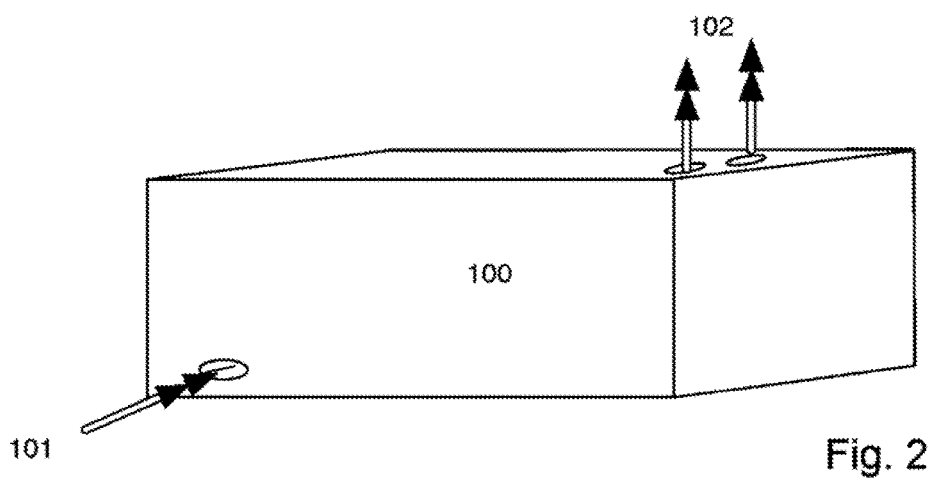
FIG. 2 is a perspective view of an electrochemical compressor used in the electrochemical compression system of FIG. 1.

Referring to FIGS. 1 and 2, an electrochemical compressor 100 can be used in a larger system 105 that uses the raised pressure of the working fluid output from the compressor 100 to act on other components 110 of the system 105 under the control of a control system 115. The direction of flow of the working fluid is depicted by arrows 101, 102, but it should be noted that this direction can be reversed and depends on the other components 110 and the operation of the control system 115. Throughout the specification, reference to a generalized electrochemical compressor 100 does not imply any structural or design limitation to the compressor. The compressor 100 could be designed using any current state of the art designs, or using designs that are described herein.

Figure 3:
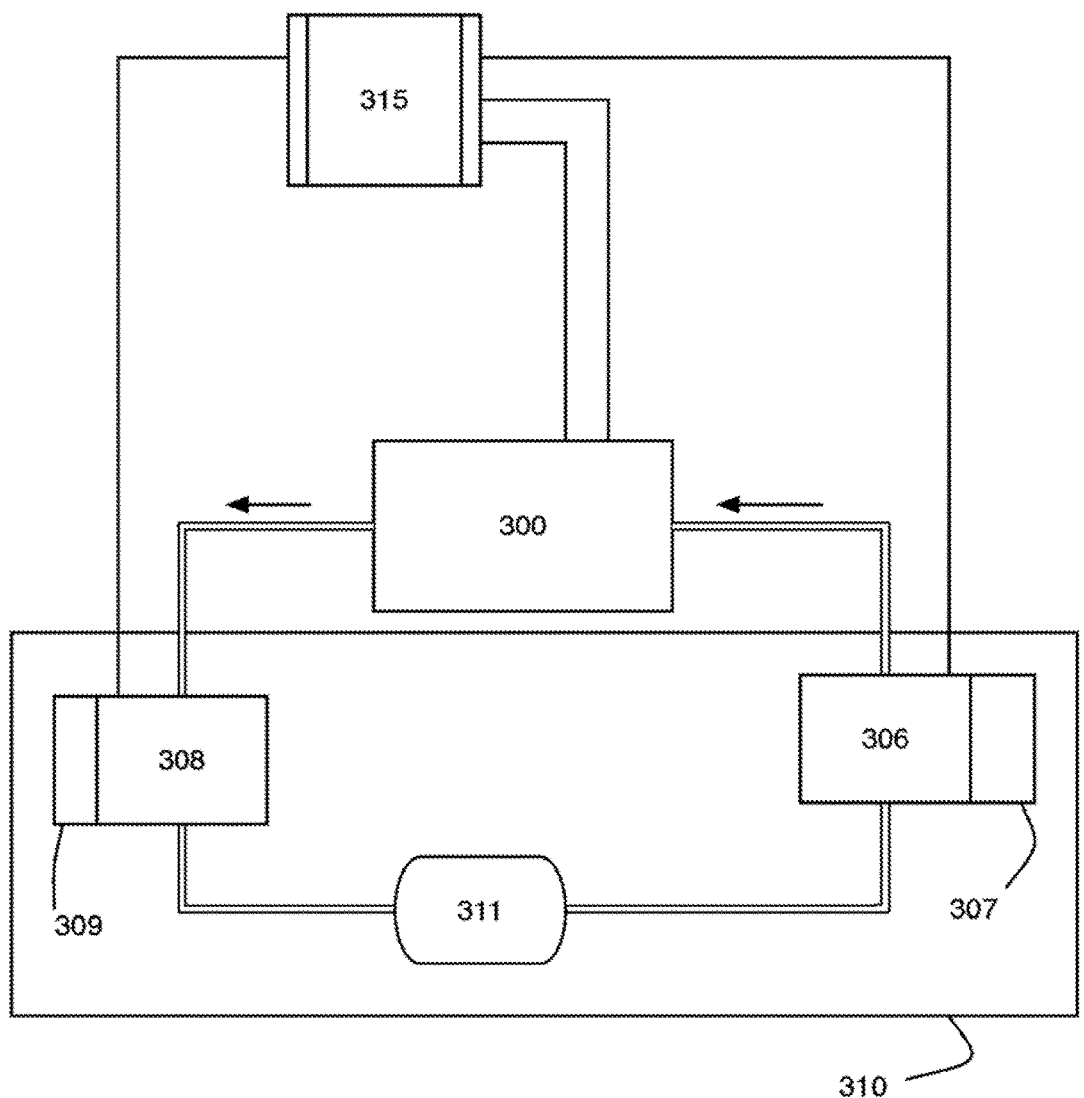
FIG. 3 is a block diagram of an exemplary electrochemical compression system that provides heat transfer.

Referring to FIG. 3, the larger system 105 can be a heat transfer system 305, which includes heat transfer components 310 such as an evaporator 306 thermally connected to a heat source 307, a condenser 308 thermally connected to a heat sink 309, and other components 311 that may be used in the system 305. Examples of other components 311 that can be used in the system 305 include expansion devices such as valves, orifices, and capillary tubes, and sensors. In such a refrigeration cycle, heat is moved from the heat source 307 to the heat sink 309. The condenser 308 transfers heat from the working fluid to the heat sink 309 and the evaporator 306 transfers heat from the heat source 307 to the working fluid. The expansion system is between the condenser and the evaporator and reduces pressure of the working fluid. The electrochemical compressor 300 is between the condenser and the evaporator.

Figure 4:
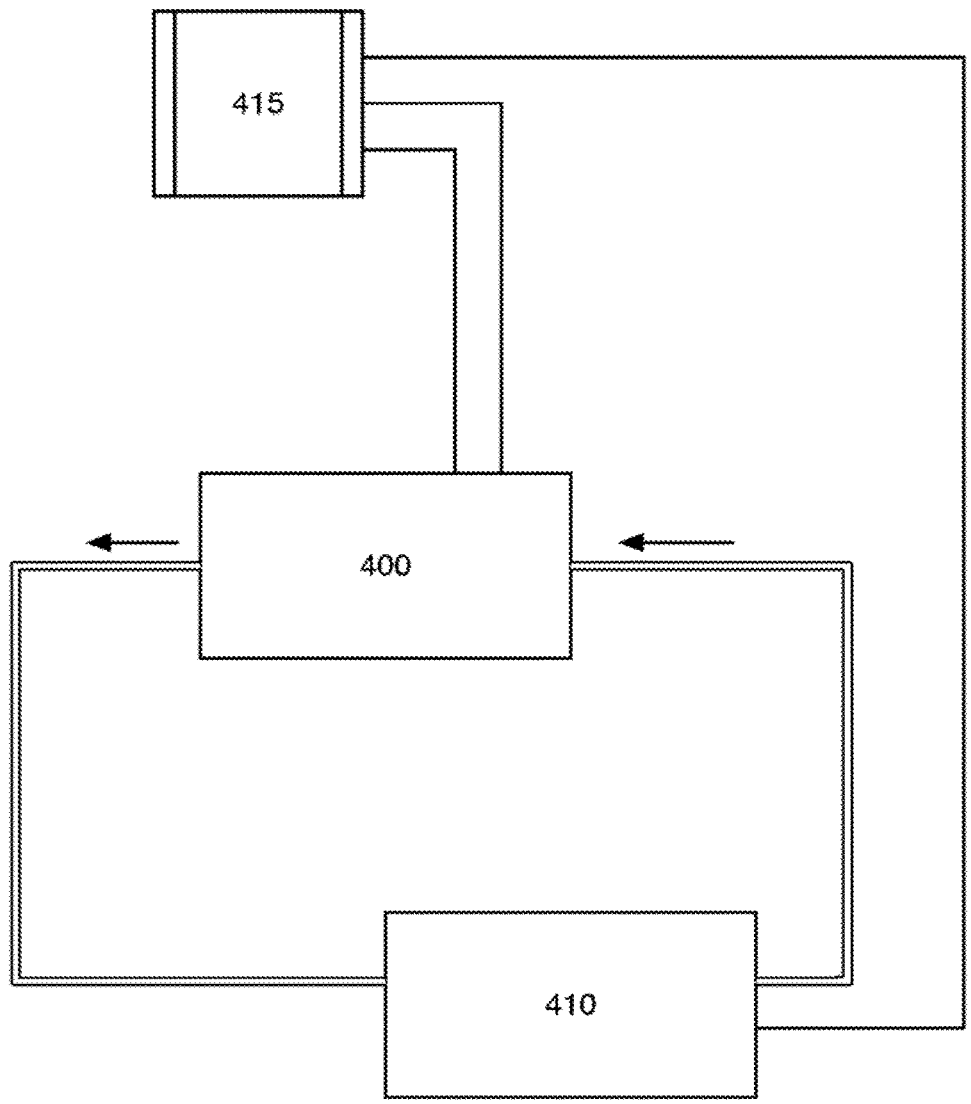
FIG. 4 is a block diagram of an exemplary electrochemical compression system that provides for motion.

Referring to FIG. 4, the larger system 105 can be a motive system 405, which converts the raised pressure into work to move one or more items (for example, rotate a shaft) of motive components 410.

Figure 5:
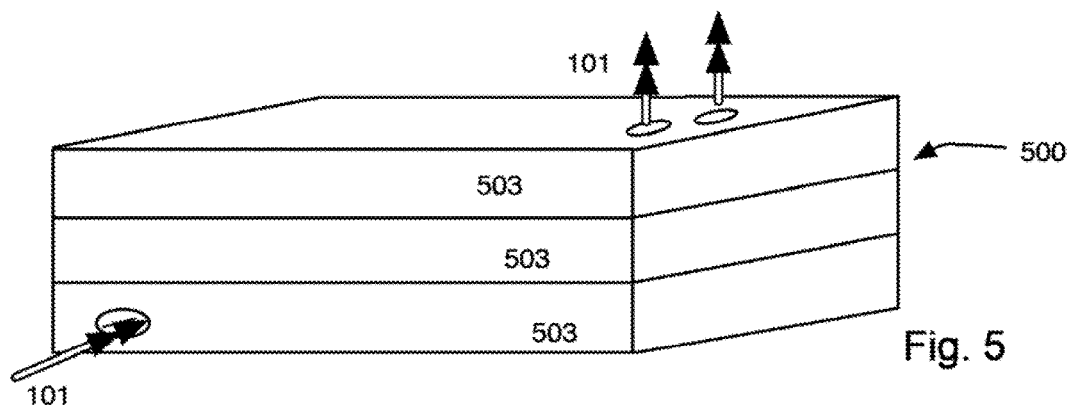
FIG. 5 is a perspective view of an exemplary electrochemical compressor for use in an electrochemical compression system.

Referring to FIG. 5, when used in such larger systems, the electrochemical compressor 500 is typically designed as a multi-stage arrangement or stack of electrochemical cells 503. This disclosure describes ways in which the electrochemical compressor is designed and used in the larger system. Significant compressive forces used on sealing surfaces of the cells and seals during assembly of the cells in the stack to ensure containment of the electro-active gases or working fluids. Assembly of these stacks can require the use of a high force generating press, and holding the stack together can be a substantial frame designed to maintain the significant compressive force after assembly. To compensate for deformation during pressurized conditions, electrochemical compressors can be designed with a way to maintain the compressive assembly forces, such as using springs, Belleview washers, elastically-deformed frame members, whether the compressor is producing zero pressure, full pressure, or anywhere in between. The higher the compressor's pressure capability, the higher the compressive force required during assembly.

Figure 6:
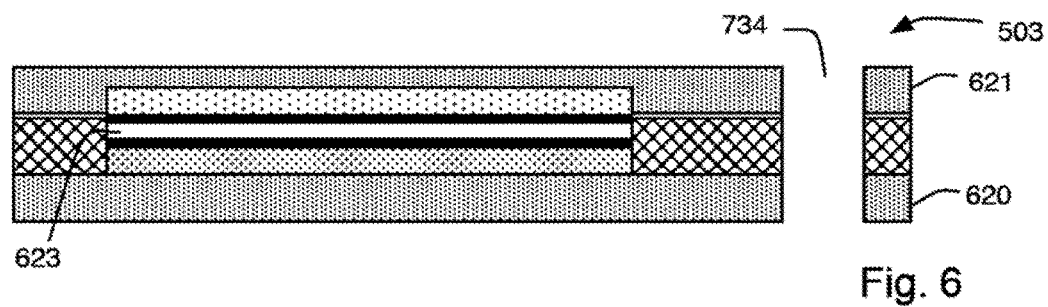
FIG. 6 is a side cross-sectional view of a single electrochemical cell that can be used in the electrochemical compressor of FIG. 5.
Figure 7A:
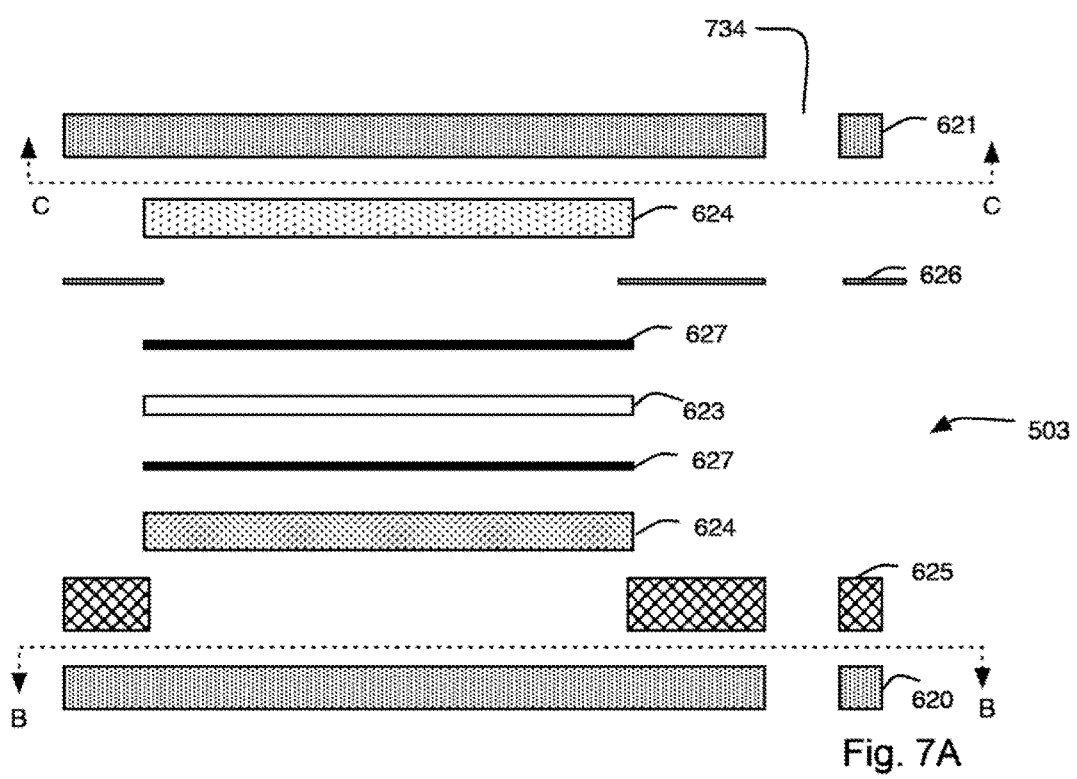
FIG. 7A is an exploded side cross-sectional view of the single electrochemical cell of FIG. 6.
Figure 7B:
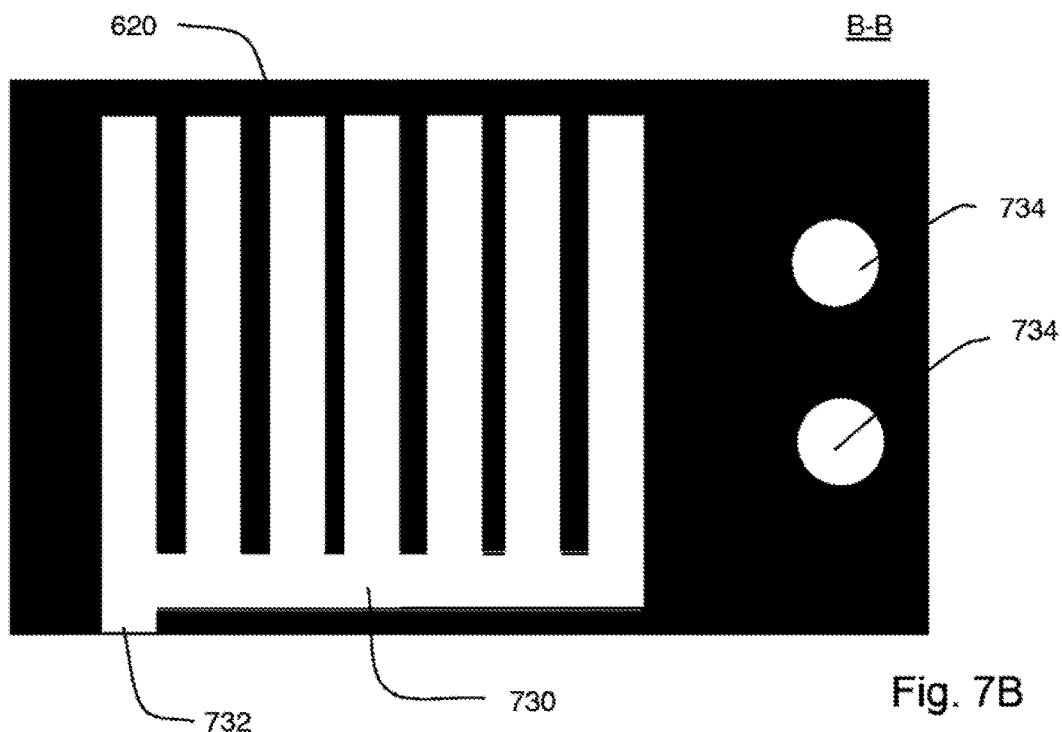
FIG. 7B is a plan view taken along line B-B of a first electrode of the electrochemical cell of FIG. 7A.
Figure 7C:
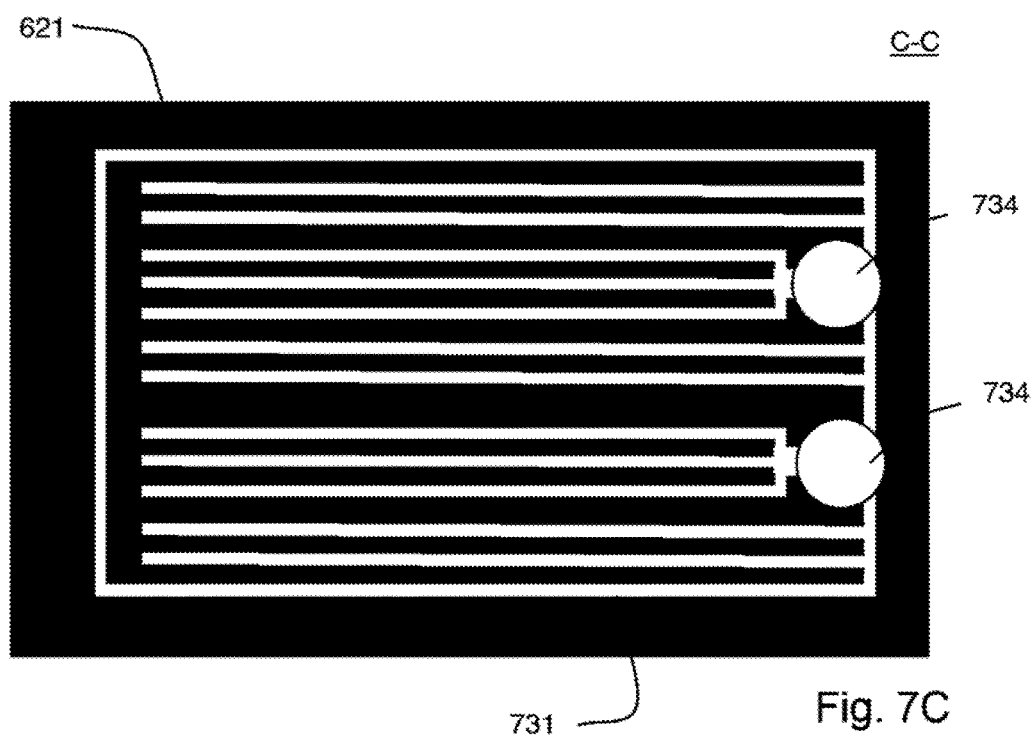
FIG. 7C is a plan view taken along line C-C of a second electrode of the electrochemical cell of FIG. 7A.

Referring also to FIGS. 6-7C, the simplest electrochemical cell 503 includes at least two electrodes 620, 621 and one or more electrolytes 623. The electrolyte 623 is disposed between and in intimate electrical contact with the electrodes 620, 621 to pass the working fluid. The electrode at which the electron producing oxidation reaction occurs is the anode electrode 620. The electrode at which an electron consuming reduction reaction occurs is called the cathode electrode 621. The direction of the electron flow in the external circuit is from anode to cathode. In order to drive the electrolysis reaction, electric power is applied to the cell electrodes from a source of electric power of the control system 115, with the polarity being selected to induce the electrolyte anion flow to the anode and the cation flow to the cathode. The electrolyte can be a solid electrolyte.

The working fluid includes at least a component that is electrochemically active. Additionally, the working fluid can also include a component that is a refrigerant if the compressor is to be used in a heat transfer system. Moreover, the component that is electrochemically active can also be a condensable material (and therefore a refrigerant). In some examples, the electrochemically active component of the working fluid can be water or chlorine. In some examples, the refrigerant of the working fluid can be hydrogen. The materials of the working fluid are chosen so as not to be reactive with other components within the compressor and system.

The working fluid includes at least a first component, primary purpose of which is to be electrochemically active and therefore take part in the electrochemical process within the compressor. The first component (the electrochemically-active component) could also provide, as a secondary purpose, a heat transfer function depending on the application.

One suitable first component is hydrogen. While hydrogen is being used primarily as the electrochemically active component of the working fluid, hydrogen also possesses useful heat transfer properties. Hydrogen's low density, high specific heat, and thermal conductivity make it an acceptable coolant. Thus, the presence of hydrogen gas within the working fluid enhances the performance of the condensable refrigerant; and provides thermal exchange opportunities at points away from thermally conductive surfaces of the fluid conduits and the heat transfer devices. Possible refrigerants within the working fluid include, for example, polar fluids such as methanol, ethanol, butanol, or propanol, which also can serve as a secondary purpose an electrochemical function.

The working fluid can include chlorine as a component; chlorine could be used advantageously in an anionic exchange membrane cell. The choice of the refrigerant depends on the exact application under consideration and other external regulatory factors. Care should be taken in the selection of the refrigerant to ensure that the refrigerant does not degrade the electrochemical performance of the system or poison the electrocatalyst employed in the compressor.

Fluid flow paths or lines 730, 731 are formed in electrodes 620, 621, respectively, for working fluid to flow. The cell 503 includes at least one inlet opening 732 fluidly connected to the flow path 730 and at least one outlet opening 734 fluidly connected to the flow path 731. In this design, the inlet opening 732 is formed in the electrode 620 and the outlet opening 734 is formed in the electrode 621 and optionally electrode 620.

Central to the operation of the electrochemical cell is the occurrence of oxidation and reduction reactions, which produce or consume electrons. These reactions generally take place at electrode/solution interfaces, where the electrodes are good electronic conductors and the solution should have high ion conductivity. In operation, electric charge is transferred by electrons between the anode and the cathode through the external circuit. To complete the electric circuit through the cell, an additional mechanism for internal charge transfer is used. This is provided by the one or more electrolytes 623, which support charge transfer by ionic conduction. The electrochemical cell 503 also includes one or more gas diffusion layers 624, one or more spacers 625, one or more sealants (such as gaskets) 626, and one or more catalysts 627.

Generally speaking, the anode and cathode include a substrate material, such as titanium, graphite, or the like, coated with a catalyst such as lead dioxide, platinum, palladium, or other known materials. The selection of a substrate and catalyst is determined by the particular electrode reactions, which depend on a given situation.

Generally, the electrolyte 623 is a material that is conductive of ions. The most common applications are fuel cells. In fuel cells, proton exchange membranes are used as electrolytic and catalyst support for providing a reaction of hydrogen oxidation on the one side of membrane and oxygen reduction on the other side. This combination of membrane and electrodes can be called a Membrane Electrode Assembly (MEA).

The stack of electrochemical cells 503 can use bipolar plates that serve on one side as the cathode for one cell and on the other side as the anode for the adjacent cell. The higher the pressure capability, the more substantial the bipolar plate becomes to withstand high pressure on one side and low pressure on the other.

Figure 8:
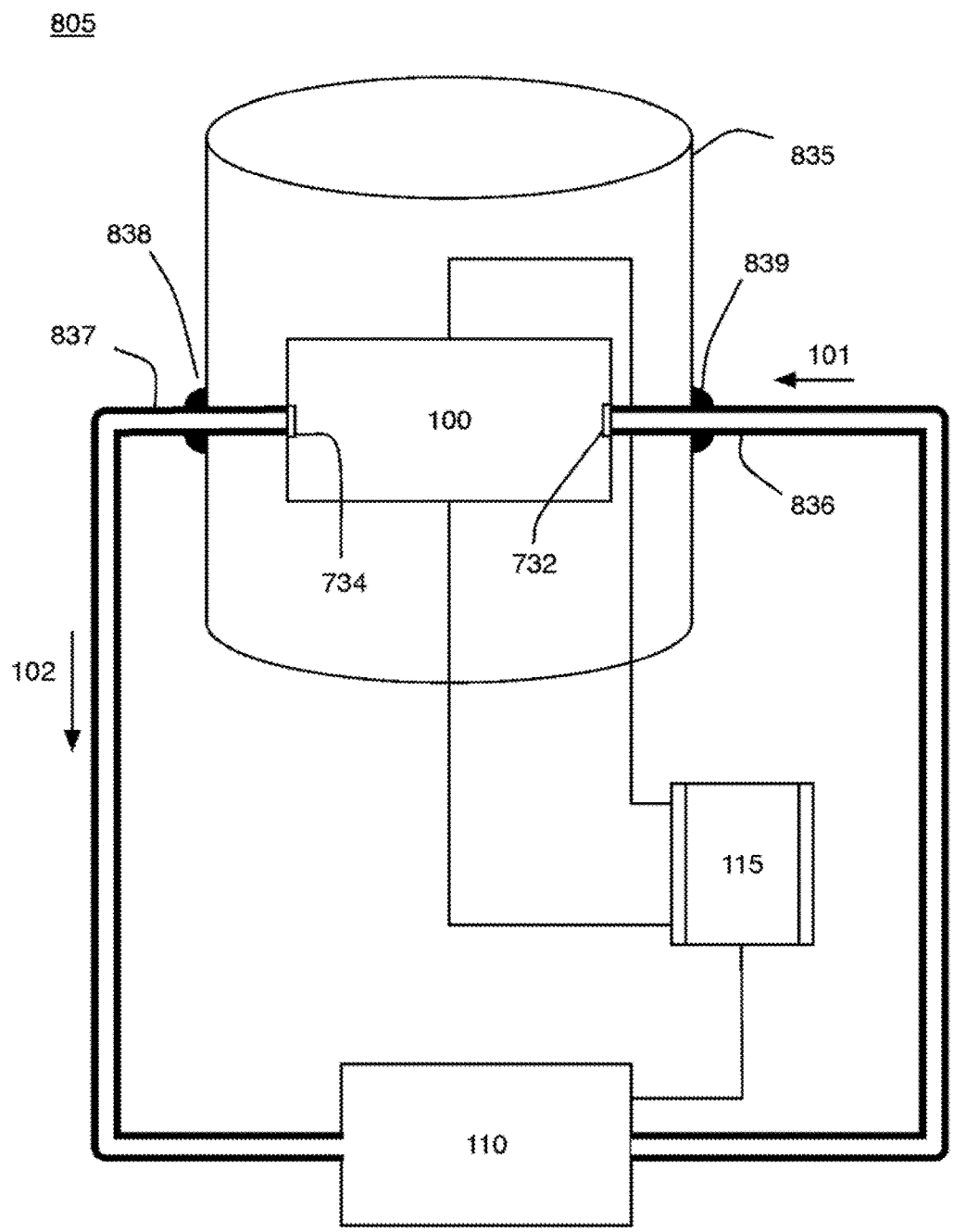
FIG. 8 is a block diagram of an electrochemical compression system in which the electrochemical compressor is housed in a sealed vessel.

Referring to FIG. 8, an electrochemical system 805 can be designed to house at least the electrochemical compressor 100 within a sealed rigid vessel 835. Other components of the larger system 805 may be incorporated into the vessel 835, but in much of the description that follows, only the compressor 100 is shown as being housed within the vessel 835.

The system includes an inlet conduit 836 for passing working fluid into the vessel 835, and an outlet conduit 837 for passing working fluid out of the vessel 835. Any working fluid that leaks from the electrochemical compressor is contained within the vessel 835. The outlet conduit 837 can extend from an outlet (such as outlet opening 734) of the electrochemical compressor 100 through a sealed outlet opening 838 of the vessel 835. In this way, the outlet of the compressor 100 is fluidly coupled to the outlet conduit 837 so that working fluid flows uninterruptedly out of the compressor and toward the other components 110 of the system 805. The inlet conduit 836 extends from an exterior of the vessel through a sealed inlet opening 839 of the vessel 835 and to an inlet (such as inlet opening 732) of the electrochemical compressor 100. In other implementations discussed below, the conduits do not extend all the way to the openings of the compressor 100.

The sealed rigid vessel can be hermetically sealed or semi-hermetically sealed. In a hermetically sealed vessel all components are permanently attached to each other so that the vessel could only be opened destructively. For example, components could be welded or glued together. In a semi-hermetically sealed vessel, at least some of the components are attached to each other in a detachable way and thus the semi-hermetically sealed vessel is able to be opened in a non-destructive manner and can be readily services. Examples of semi-hermetic seals include bolts, clamps and gaskets or O-rings.

By placing the electrochemical compressor 100 inside a secondary sealing device (the sealed vessel 835), the performance impact of leakage from the compressor 100 is reduced. For example, if the electrochemically active component of the working fluid leaks from the compressor 100, the vessel 835 contains the component and becomes slightly pressurized. The increased pressure inside the vessel 835 reduces the pressure gradient and therefore the loss (or leakage) rate of the electrochemically active component from the compressor 100. The maximum pressure that can be allowed in the vessel 835 depends on the operating parameters of the electrochemical compressor 100, the materials of the vessel 835, and the geometry of the vessel 835. The vessel 835 can have any suitable geometry, and is not limited to a cylindrical geometry shown in the drawings. Moreover, the material of the vessel 835 can be rigid enough to withstand the pressure and also should be non-reactive to the working fluid so as to prevent corrosion of the interior wall of the vessel 835. As discussed below, the pressure within the vessel 835 can be controlled using any suitable methods to prevent the pressure from exceeding the operating parameter of the compressor 100 that is housed within the vessel 835.

Additionally, by placing the compressor 100 within a secondary sealing device 835, the compressor functionality can be at least partially separated from other mechanical functions such as sealing and support of the proton exchange membrane (electrolyte). Moreover, it is not necessary to design the compressor 100 to be completely leak proof when it is housed in the vessel 835.

Figure 9A:
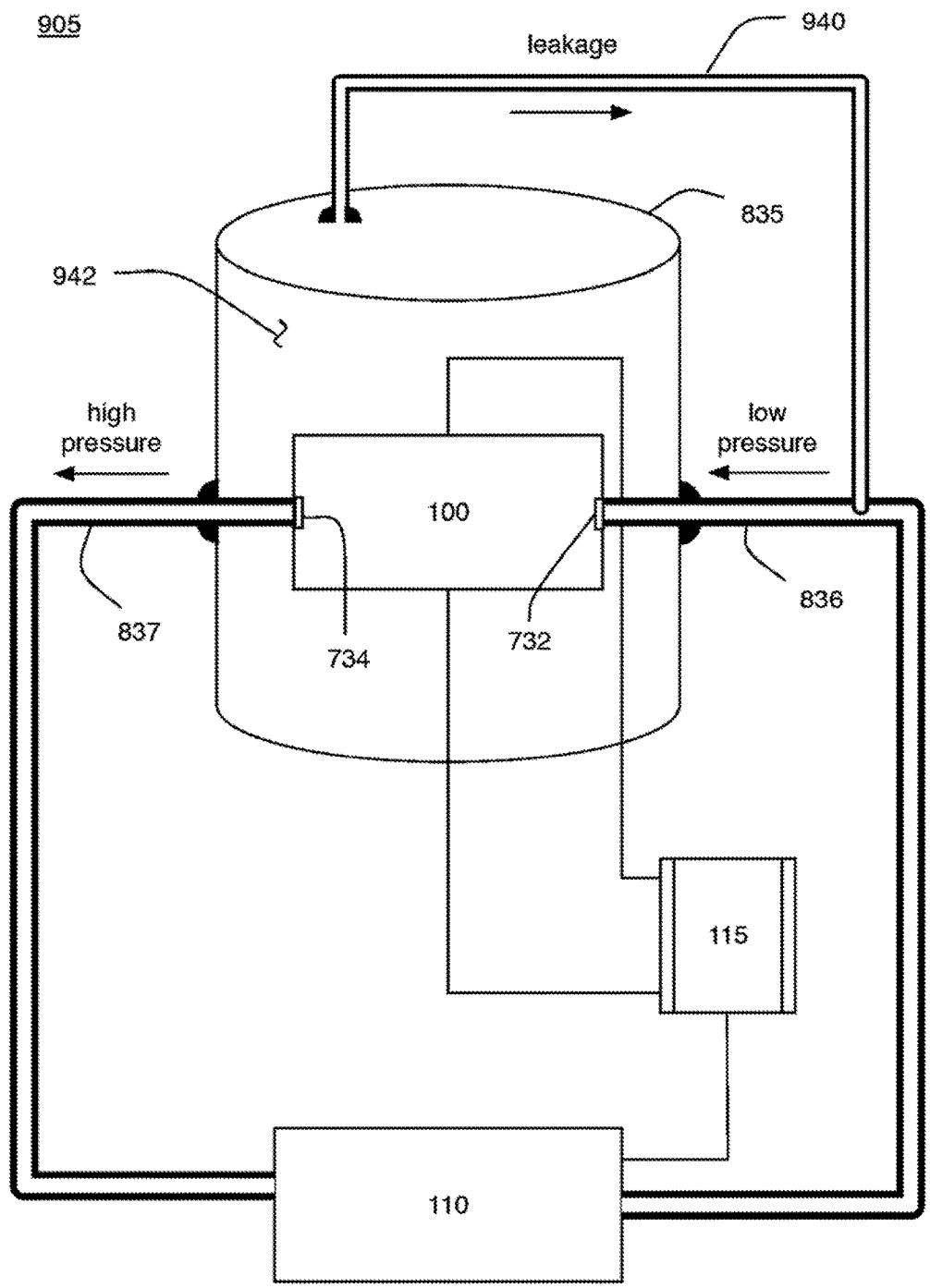
FIG. 9A is a block diagram of an exemplary electrochemical compression system in which the electrochemical compressor is housed in a sealed vessel and a leakage conduit is included.
Figure 9B:
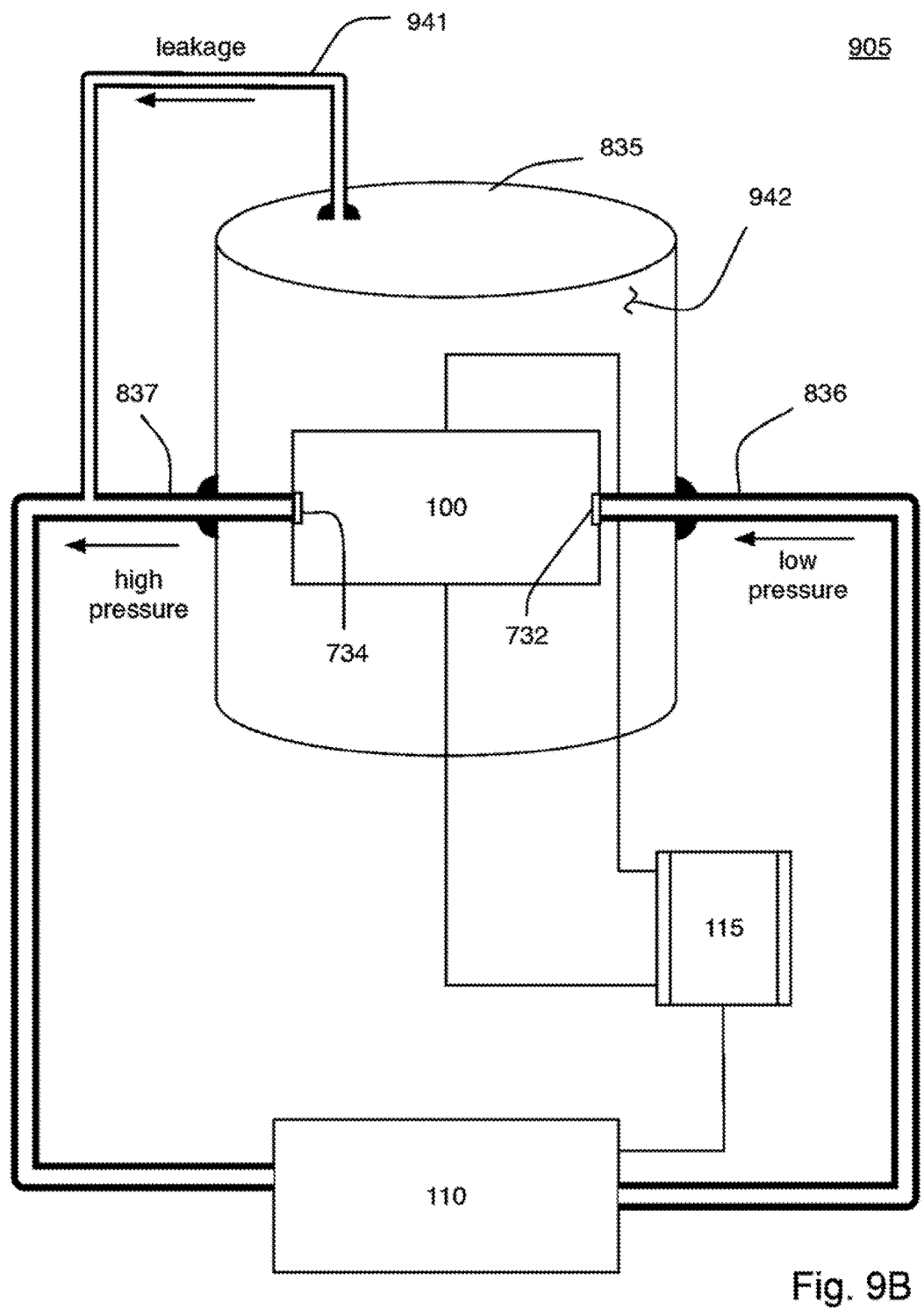
FIG. 9B is a block diagram of an exemplary electrochemical compression system in which the electrochemical compressor is housed in a sealed vessel and a leakage conduit is included.

Referring also to FIGS. 9A and 9B, in some implementations, the electrochemical system 905 includes a leakage flow conduit 940 or 941. A first end of the leakage flow conduit 940, 941 is fluidly coupled to an interior 942 of the vessel 835. In the implementation shown in FIG. 9A, a second end of the leakage flow conduit 940 is fluidly coupled to the inlet conduit 836. In the implementation shown in FIG. 9B, the second end of the leakage flow conduit 941 is fluidly coupled to the outlet conduit 837. In this way, the leaded working fluid is recycled back into the flow path of the larger system 105.

Figure 10:
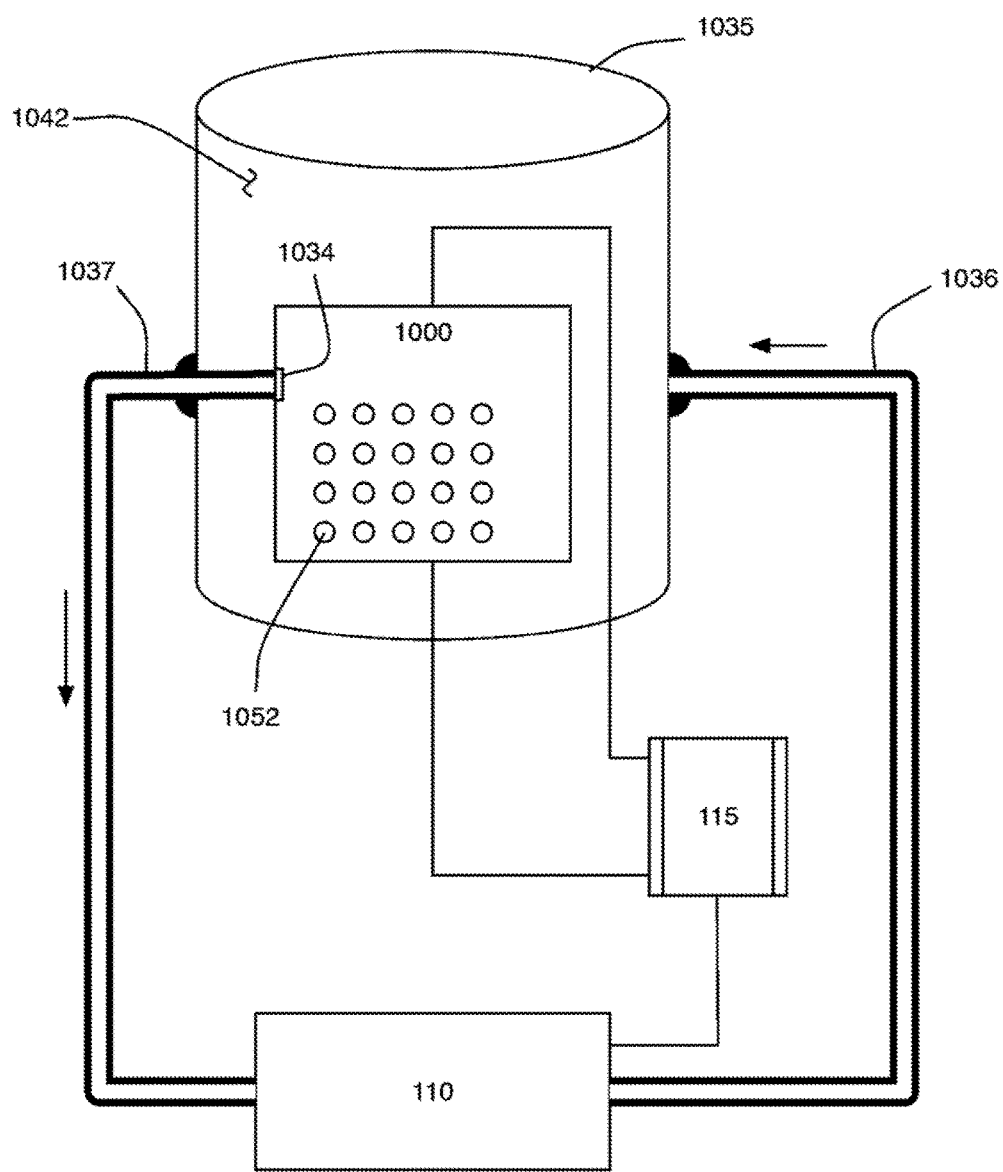
FIG. 10 is a block diagram of an exemplary electrochemical compression system in which the electrochemical compressor is housed in a sealed vessel and the electrochemical compressor includes an open input for working fluid.
Figure 11:
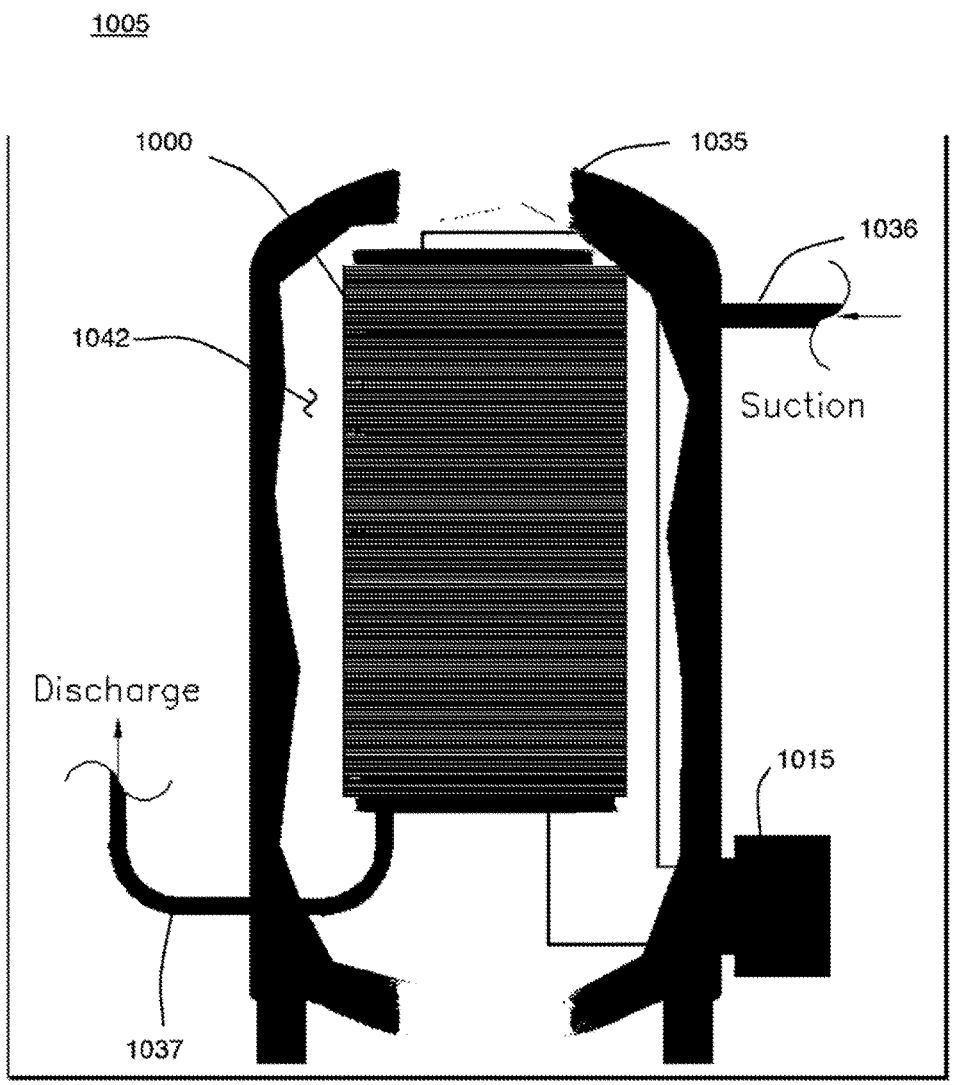
FIG. 11 is a diagram of the electrochemical compression system of FIG. 10.

Referring to FIGS. 10 and 11, in another implementation of the electrochemical system 1005, the electrochemical compressor 1000 is pieced within the vessel 1035, and the electrochemical compressor 1000 is designed with a plurality of open inlet openings 1052 that more efficiently pull working fluid into the compressor 1000 from the surrounding environment, which, in this case, is the interior 1042 of the vessel 1035. In this particular implementation, the inlet openings 1052 pull the working fluid from the interior 1042 of the vessel 1035 and not directly from the inlet conduit 1036, which in this case extends from an exterior of the vessel 1035 into the interior 1042 of the vessel 1035 but does not extend all the way to the openings 1052.

Figure 12:
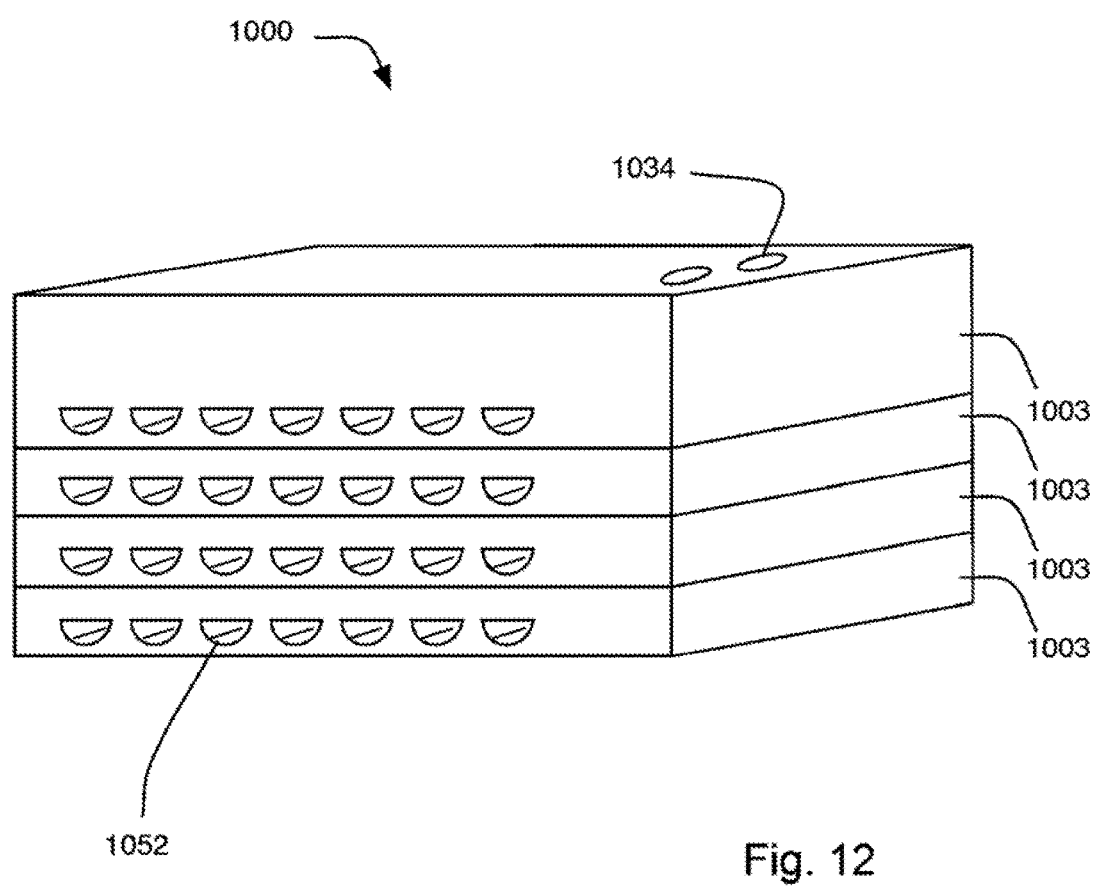
FIG. 12 is a perspective view of an electrochemical compressor of FIGS. 10 and 11.
Figure 13A:
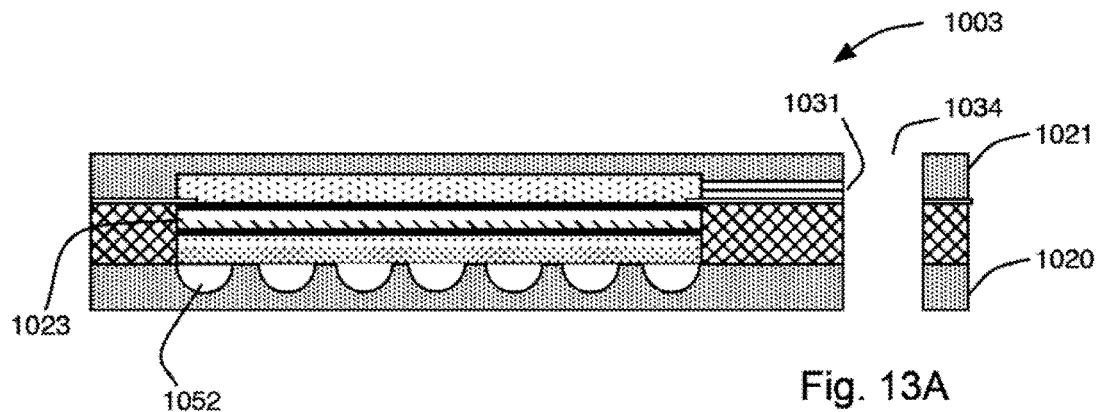
FIG. 13A is a side cross-sectional view of an electrochemical cell in the electrochemical compressor of FIG. 12.
Figure 13B:
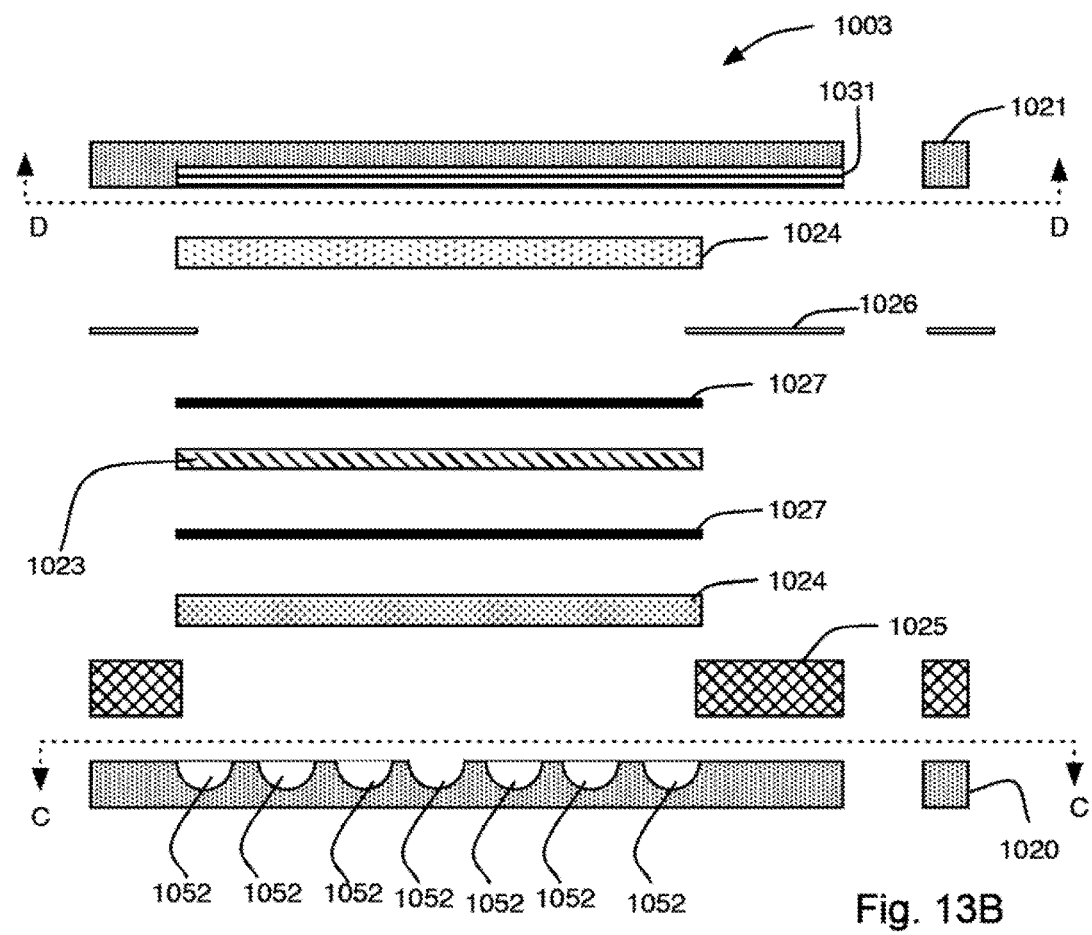
FIG. 13B is an exploded side cross-sectional view of the electrochemical cell of FIG. 13A.
Figure 13C:
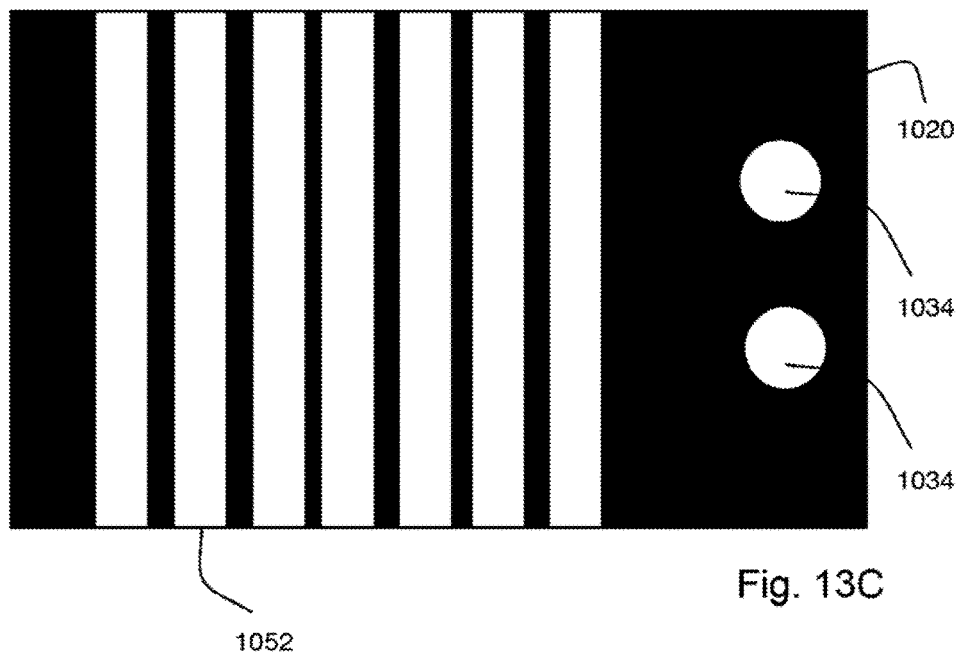
FIG. 13C is a plan view taken along line C-C of a first electrode of the electrochemical cell of FIG. 13B.
Figure 13D:
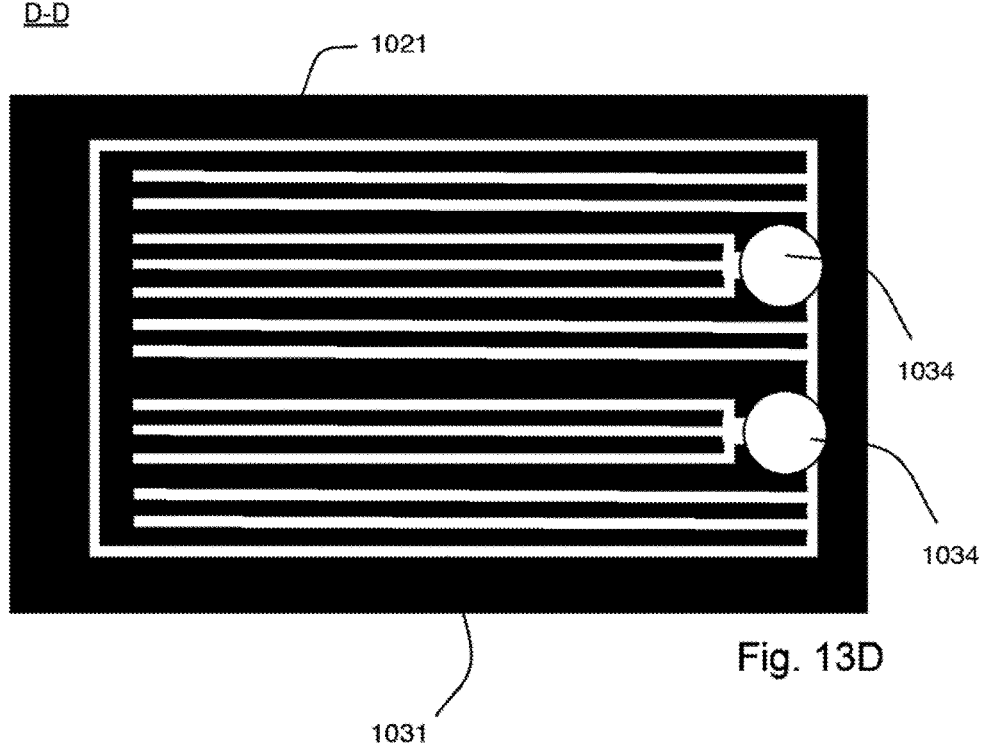
FIG. 13D is a plan view taken along line D-D of a second electrode of the electrochemical cell of FIG. 13B.

Referring to FIG. 12, the electrochemical compressor 1000 includes a stack of one or more electrochemical cells 1003, all of which are housed within an enclosure that also houses working fluid. The stack can be made of any number of cells 1003, and the number of cells depends on the application of the system 1005.

Referring also to FIGS. 13A-13D, each electrochemical cell 1003 includes the plurality of inlet openings 1052 fluidly connected to the interior 1042 of the vessel 1035 to receive working fluid. The other components of the cell 1003 are similar to the components of the cell 503 described above and their numbering follows the same convention as that of the cell 503 described above and thus their description is not repeated. In particular, the inlet openings 1052 can be formed in the first electrode 1020 (for example, an anode) of the cell 1003. The cell 1003 also includes the second electrode 1021 (for example, the cathode) and the electrolyte 1023 disposed between the cathode and the anode to pass the working fluid received from the plurality of inlet openings 1052.

Figure 14:
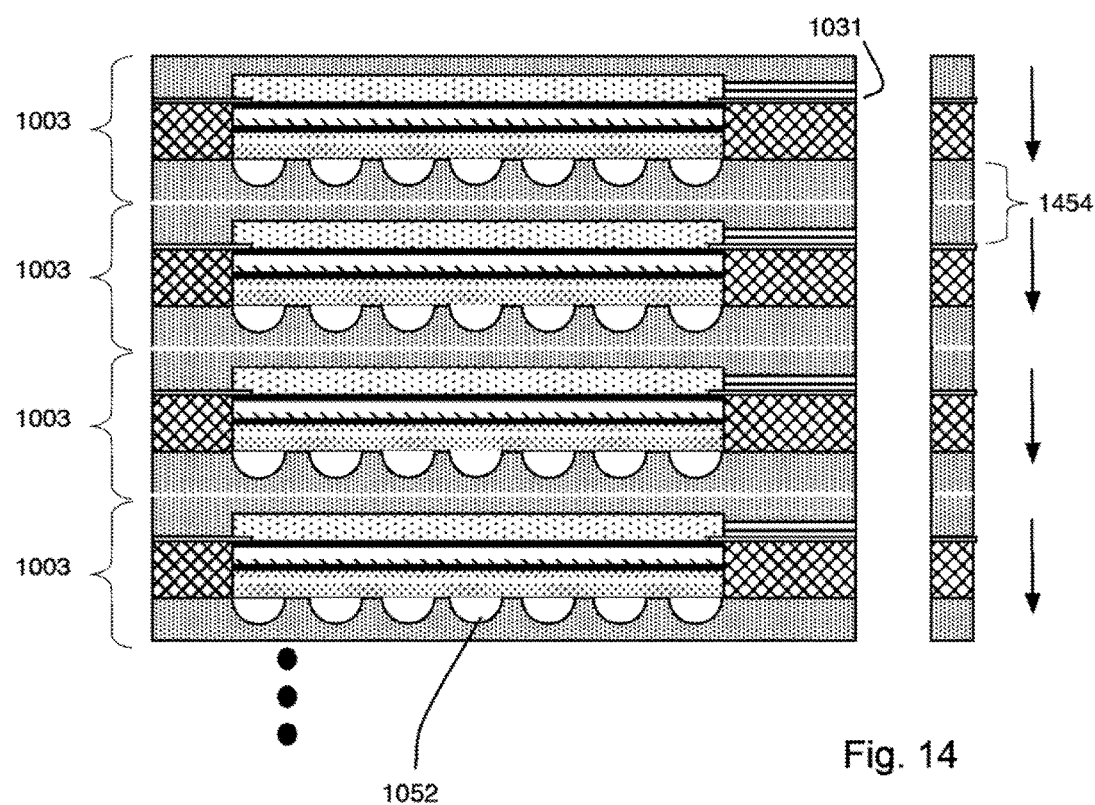
FIG. 14 is a side cross-sectional view of an exemplary electrochemical compressor of FIG. 12 that uses bipolar plates.
Figure 15:
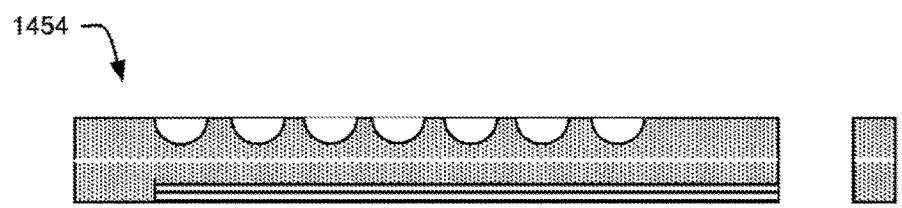
FIG. 15 is a side cross-sectional view of an exemplary bipolar plate for use in the compressor of FIG. 14.

Referring to FIG. 14, the electrochemical compressor 1000 can be a stack of electrochemical cells 1003. In this particular design, the cathode of one cell 1003 is adjacent to the anode of the next cell 1003. To reduce manufacturing cost, and to maintain greater thermal conductivity, the anode and cathode of adjacent cells 1003 can be designed as a "bipolar plate" 1454, which is a unitary plate, as shown in FIG. 15. In the bipolar plate, both anode and cathode are held at the same electrical potential. Thus, with a stack of cells 1003 using the bipolar plate arrangement, the overall pressure differential between the top cell and the bottom cell can be large depending on the application of the system and the number of stacked cells 1003 in the compressor. As the pressure differential increases, so does the pressure applied to internal components of the cells 1003, and if the pressure differential is in the same direction for every cell 1003 in the stack (as shown by the arrows on the right hand side of FIG. 14), then it is possible that too much pressure is applied to the components such as the electrolyte 1023 within the cell 1003.

Figure 16:
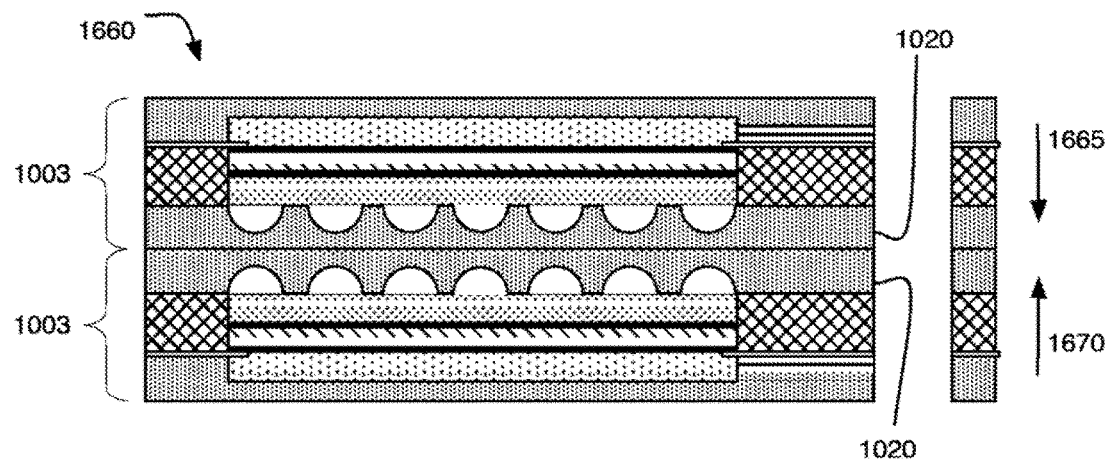
FIG. 16 is a side cross-sectional view of an exemplary pressure-balanced pair of electrochemical cells for use in the compressor of FIG. 12.

Referring to FIG. 16, to alleviate the above noted issue of high pressure differential, the stack of cells within the electrochemical compressor can be arranged with one or more pressure-balanced pairs 1660 of cells. In this case, the first electrode (for example, the anode) of the first electrochemical cell in the pair 1660 is adjacent to and at the same potential as the first electrode (in this example, the anode) of the second electrochemical cell in the pair 1660. Moreover, the two electrochemical cells in the pair 1660 are flipped relative to each other so that the pressure differential 1665 of the first cell in the pair 1660 is directed in an opposite direction to the pressure differential 1670 of the second cell in the pair 1660. In this way, the pressure differentials are not compounded in the pair 1660 but are balanced or canceled out so.

Figure 17:
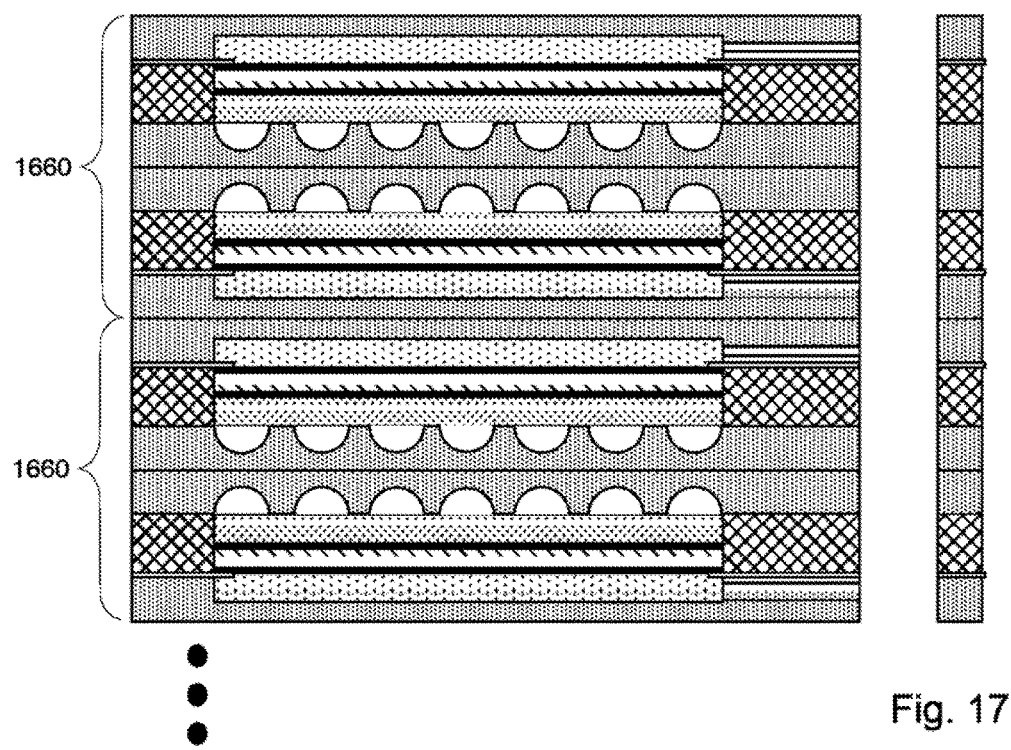
FIG. 17 is a side cross-sectional view of a stack of the pairs of FIG. 16.

Referring to FIG. 17, the pressure-balanced pairs 1660 can be stacked on top of each other in an arrangement as shown in which the anodes of each cell in a pair are adjacent to and at the same potential as each other and the cathodes of adjacent pairs are adjacent to and at the same potential as each other.

The adjacent electrodes in the pressure-balanced pairs 1660 can be made into a unitary form so that they make up a single plate that functions as the anode for both cells in the pair. Moreover, the fluid flow paths can be arranged to access both cells in the pair or can be fluidly separated from each other.

Figure 18:
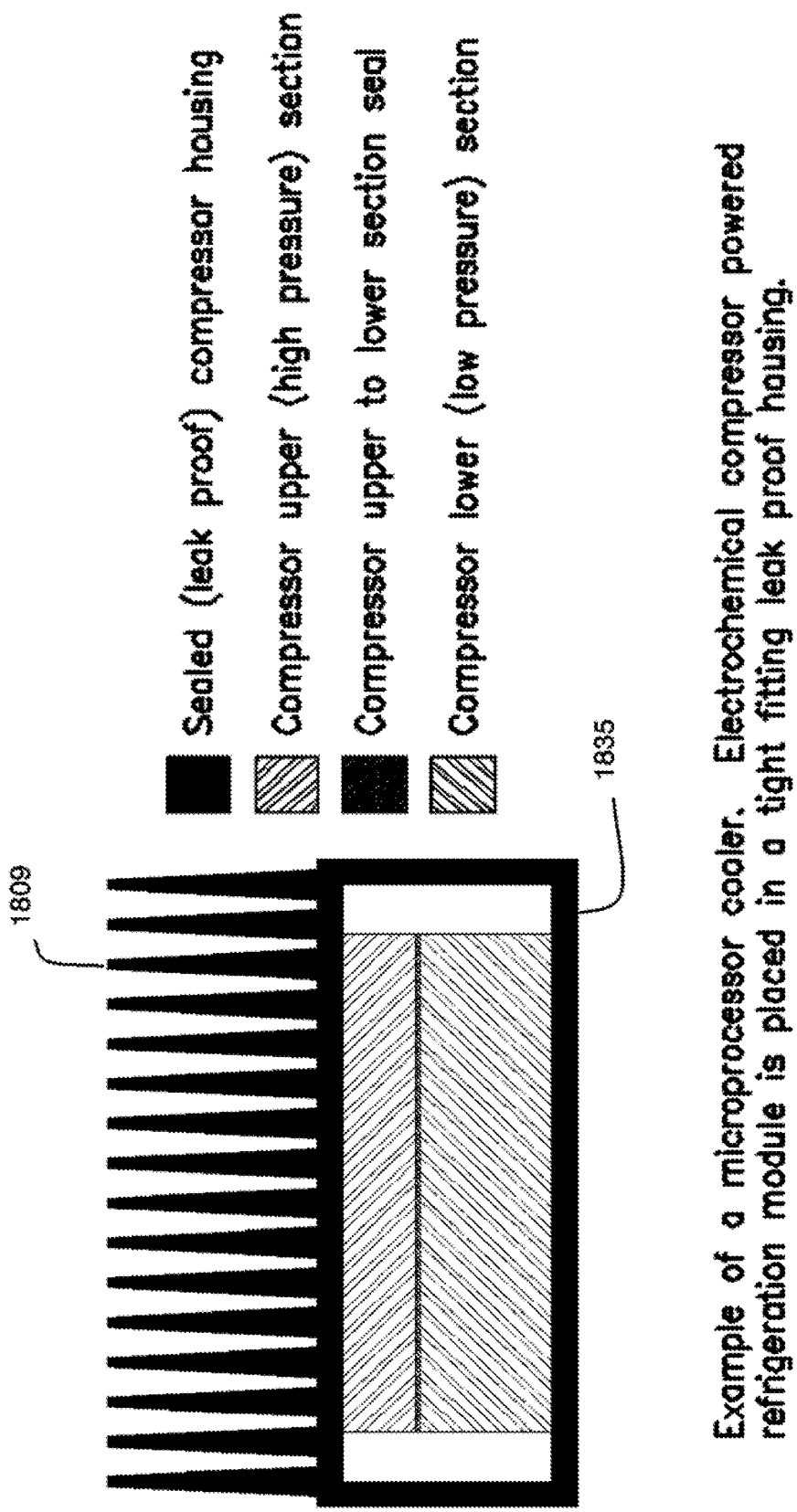
FIG. 18 is a side cross-sectional view of an exemplary electrochemical compressor system in which components outside the compressor are housed within the sealed vessel.

Referring to FIG. 18, in another implementation, parts of the components 410 within the system 405 could be incorporated into the vessel 835. Such a design can be feasible, for example, when the system 405 is a microprocessor cooler. In this example, the condenser and heat sink 1809 are incorporated into the vessel 835, so that the vessel 835 has thermally conductive properties and acts to remove heat from the working fluid within the microcompressor cooler.

As discussed above, a system can include an electrochemical compressor that is contained in a vessel. Working fluid can leak from the compressor and collect in an interior of the vessel. The loss of working fluid, and the electrochemically active component in the working fluid, can eventually lead to a degradation in performance of the compressor and other components of the system. The performance degradation may lead a user of the system to replenish the lost working fluid by disassembling the system and adding working fluid. However, such disassembly and service can lead to downtime and possibly damage the system.

A storage device is described below. The storage device is fluidly connected to the interior of the vessel and collects and stores electrochemically active fluid that leaks from the electrochemical compressor and/or other components of the system. The storage device also can returns the leaked fluid to the compressor for re-use. As such, the storage device can mitigate the downtime and reduce possible damage to the system. Further, the storage device can be manufactured to be pre-loaded, prior to use in an electrochemical system, with the electrochemically active fluid. Such a pre-loaded storage device can be fluidly connected to a new or existing electrochemical system to supply electrochemically active fluid to the system, and to collect and replenish the electrochemically active fluid during the lifetime of the system.

In addition to reducing or eliminating downtime related to replenishment of fluid, the storage device also can improve safety for operators of an electrochemical system by reducing the operator's handling and exposure to potentially dangerous electrochemically active fluids, such as hydrogen gas. Further, because the storage device may include a material that is undamaged or otherwise unaffected by contact with a refrigerant, the storage device can be used in a refrigeration system that uses a working fluid that is a mixture of an electrochemically active fluid and a refrigerant.

Referring to FIG. 19A, a perspective view of an example storage device 1900 is shown. The example storage device 1900 can be used in any of the electrochemical systems discussed above. FIG. 19B shows a cut-away perspective view of the storage device 1900 and a perspective view of a sorbing medium 1925 that is inside the storage device 1900. FIG. 19C shows a cross-sectional view of the example storage device 1900 taken along line 19C-19C.

The example storage device 1900 includes a housing 1910, an inlet 915 that receives working fluid, and an outlet 920 through which working fluid flows out of the storage device 1900. The housing 920 contains the sorbing medium 1925 (FIG. 19B). The sorbing medium 1925 has a first side 1927, a second side 1928, and a middle portion 1929. The inlet 915 is fluidly connected to the sorbing medium 1925 at the side 1927, and the outlet 915 is fluidly connected to the sorbing medium at the side 1928. In the examples of FIGS. 19A-C, the sorbing medium 1925 is within the housing 1910. However, this is not necessarily the case, and the sorbing medium 1925 can be used without the housing 1925.

The sorbing medium 1925 includes a material that attracts and holds or retains at least a component or at least a portion of the working fluid that is used in the electrochemical system. The sorbing medium 1925 can be, for example, a metal hydride. The sorbing medium 1925 can be any material that sorbs an electrochemically active component of a working fluid and that is unaffected or undamaged by a refrigerant that is in the working fluid. For example, the storage device 1900 can be used in a refrigeration system that employs a working fluid that has an electrochemically active component and a refrigerant. In this example, the sorbing medium 1925 can store an electrochemically active component of the working fluid with or without also storing the refrigerant. Further, the sorbing medium 1925 can store a portion of the working fluid by retaining less than all of the working fluid, or less than all of a component of the working fluid, that interacts with the sorbing medium 1925.

The working fluid enters the sorbing medium 1925 through the inlet 915. When the working fluid makes contact with a portion of the sorbing medium 1925, that portion of the sorbing medium 1925 adsorbs or absorbs the electrochemically active component of the working fluid and stores the electrochemically active component of the working fluid in the sorbing medium 1925. The sorbing medium 1925 has a relatively high specific surface area. The specific surface area is the surface are of a material per unit of mass. The high specific surface area allows the sorbing medium 1925 to have relatively more interactions with the working fluid as compared to a medium that has a lower surface area. In some implementations, the sorbing medium 1925 is a material that has all, substantially all, a large portion (such as 95%), or a majority of its surface positioned for interaction with working fluid that enters the storage device 1900 through the inlet 1925. For example, the sorbing medium 1925 can be folded sheet metal, pieces of sheet metal, a porous material, a porous metal, a solid material that is permeable to the electrochemically active component of the working material, or a liquid.

The rate at which the sorbing medium 1925 collects and stores the electrochemically active component of the working fluid depends partially on the amount of surface area of the sorbing medium 1925 that is exposed to the working fluid. For example, decreasing the amount of surface area of the sorbing medium 1925 that interacts with the working fluid can decrease the rate of collection and storage of the working fluid. Increasing the amount of surface area of the sorbing medium 1925 that interacts with the working fluid can increase the rate of collection and storage of the working fluid. The shape and/or the material of the sorbing medium 1925 can be changed to adjust the rate of collection of the working fluid.

Because the electrochemical compressor can leak over a relatively long time period (perhaps weeks or months), and can require replenishing every few weeks or months, the storage device 1900 can be designed to collect electrochemically active component of the working fluid relatively slowly. As such, the sorbing medium 1925 can include materials and/or be of a shape that would be unsuitable for an electrochemical compressor or electrochemical system that required more frequent replenishing. However, the sorbing medium and the storage device 1900 can include materials that collect electrochemically active component of the working fluid over a short time scales, such as minutes or hours. Moreover, because the storage device 1900 can be used with a system that is stationary, the storage device 1900 can be fully effective while also storing less working fluid than may be required for a moving system.

Figure 20:
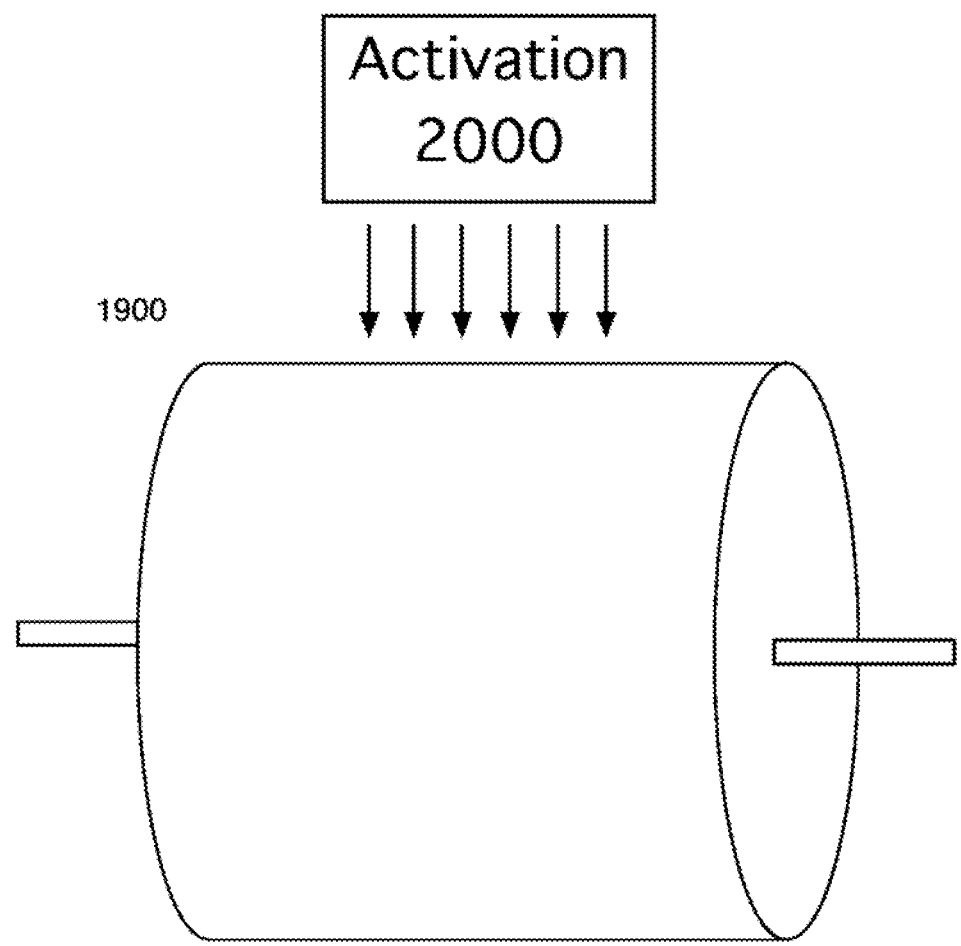
FIG. 20 is a perspective view of an example storage device.

Referring to FIG. 20, an example of an external activation 2000 that can be used to liberate stored fluid from the storage device 1900 is shown. The external activation 2000 can be, for example, a heater placed on or near the storage device 1900. Applying heat to the storage device 1900 can cause the electrochemically active fluid that is stored in the sorbing medium 1925 to be released from the sorbing medium 1925 and exit the storage device 1900 through the outlet. In another example, the external activation 2000 can be an external pressure change in the atmosphere that surrounds or is in the vicinity of the storage device 1900. For example, a decrease in pressure can cause the sorbing medium 1925 to release the stored electrochemically active fluid. In another example, the sorbing medium 1925 can have a partial pressure associated with the material of the sorbing medium 1925. If gas is lost so that the partial pressure drops, fluid that is stored as gas in the sorbing medium 1925 would be released to bring the partial pressure back up.

Although the example of FIG. 20 shows an external activation 2000, the activation can be inside of the housing 1910. For example, a heater can be placed inside the housing, or a pressure change can be caused within the housing to liberate the stored electrochemically active fluid from the sorbing medium 1925.

Figure 21:
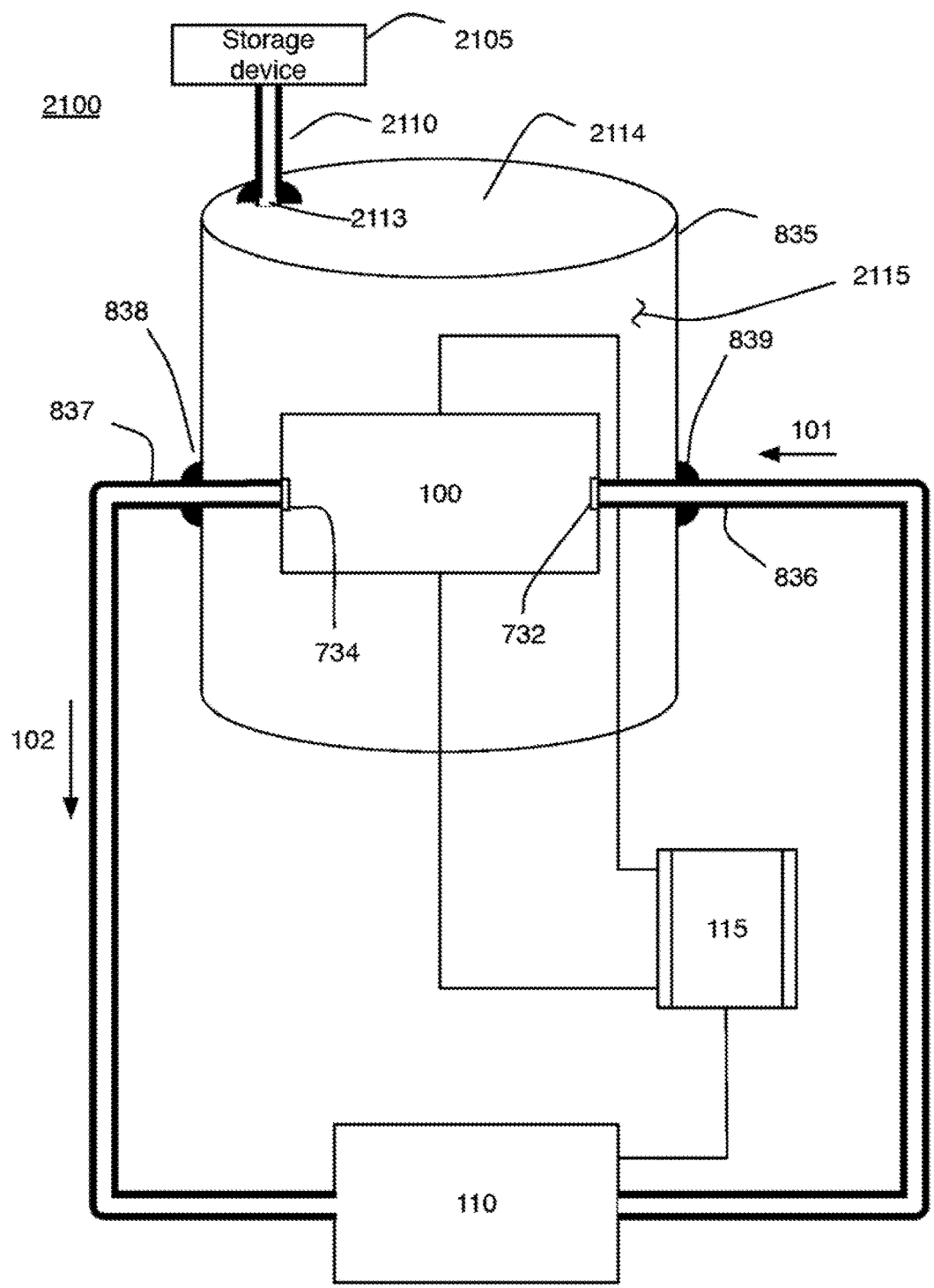
FIGS. 21-26 are block diagrams of example electrochemical systems.

Referring to FIG. 21, an electrochemical system 2100 is shown. The electrochemical system 2100 is similar to the system 805 discussed in FIG. 8, except the system 2100 includes a storage device 2105. A conduit 2110 passes through an opening 2113 defined by a wall 2114 of the vessel 835. The conduit 2010 fluidly connects the storage device 2105 to an interior 2115 of the vessel 835.

The storage device 2105 can be similar to the storage device 11900 discussed above with respect to FIGS. 19A-20. In operation, the electrochemical compressor 100 can leak working fluid. For example, the compressor 100 can leak fluid by releasing working fluid from a portion of the compressor 100 other than the outlet 734. In another example, leaked working fluid can occur when the connection between the outlet 734, the conduit 837, and the compressor 100 is not fluid tight. The leaked working fluid can travel towards the upper portion of the vessel 835 and enter the conduit 2110 through the opening 2113. The leaked fluid then passes into the storage device 2105, where the electrochemically active component of the fluid is stored in the sorbing medium 1925 (FIGS. 19B and 19C).

Figure 22:
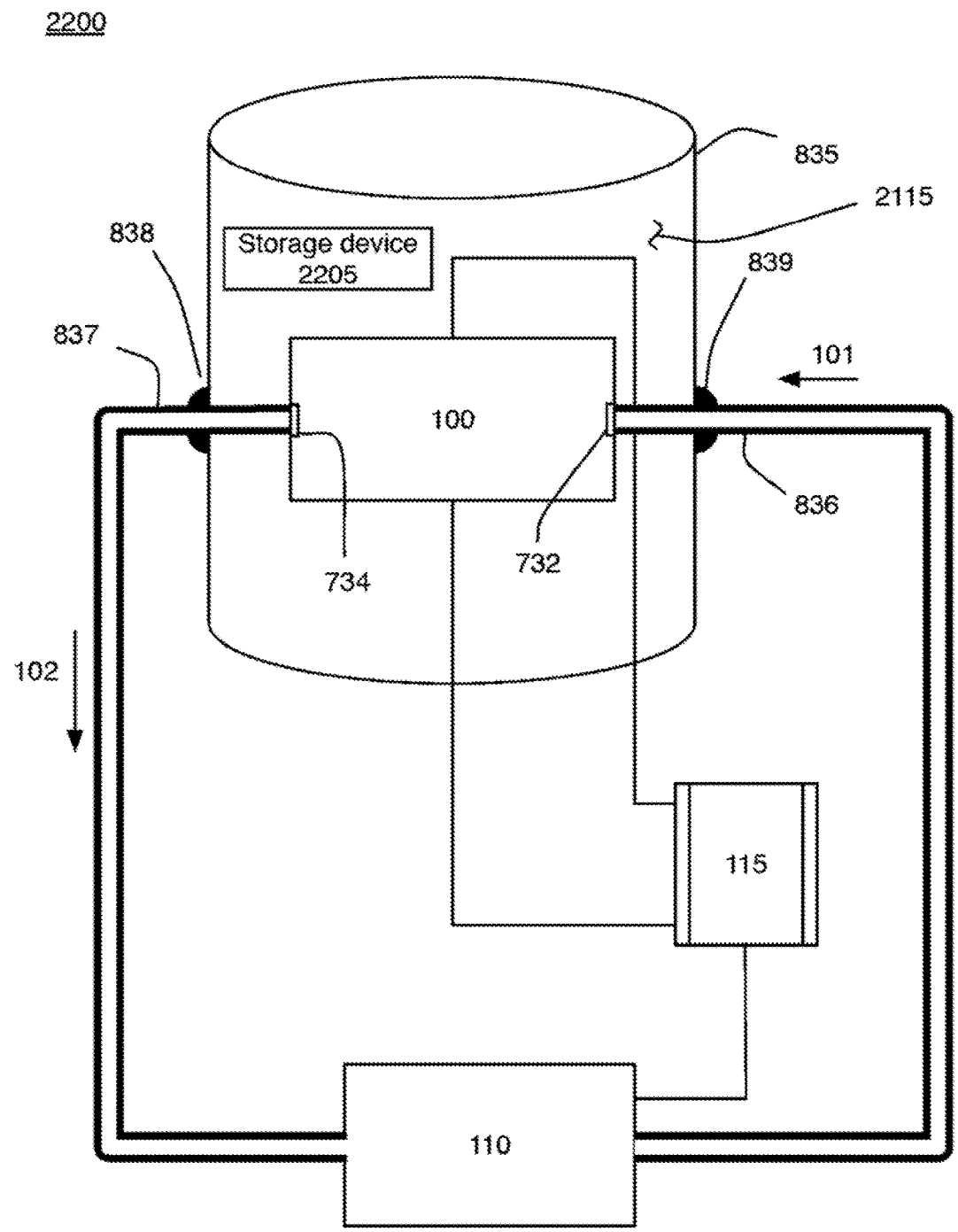

Although in the example of FIG. 21, the storage device 2105 is shown as being external to the vessel 835, this is not necessarily the case. Referring to FIG. 22, an electrochemical system 2200 is shown. The system 2200 is similar to the system 2100, except that the vessel 835 contains a storage device 2205. Thus, the storage device 2205 is inside of the vessel 835. The storage device 2205 is similar to the storage device 1900 discussed with respect to FIGS. 19A-20. The storage device 2205 is in fluid communication with the interior of the vessel 835 through an inlet and an outlet (not shown) on the storage device 2205. The storage device 2205 collects and stores working fluid that leaks from the compressor 100.

As such, a storage device such as the storage device 1900 can be external to a vessel, such as the vessel 835, that contains an electrochemical compressor, or the storage device 1900 can be in the interior of the vessel 835. When placed external to the vessel, the storage device 1900 can be larger than the vessel and can have an increased capacity to store electrochemically active fluid. When placed internal to the vessel, the vessel and storage device 1900 can form a relatively compact and self-contained device.

Figure 23:
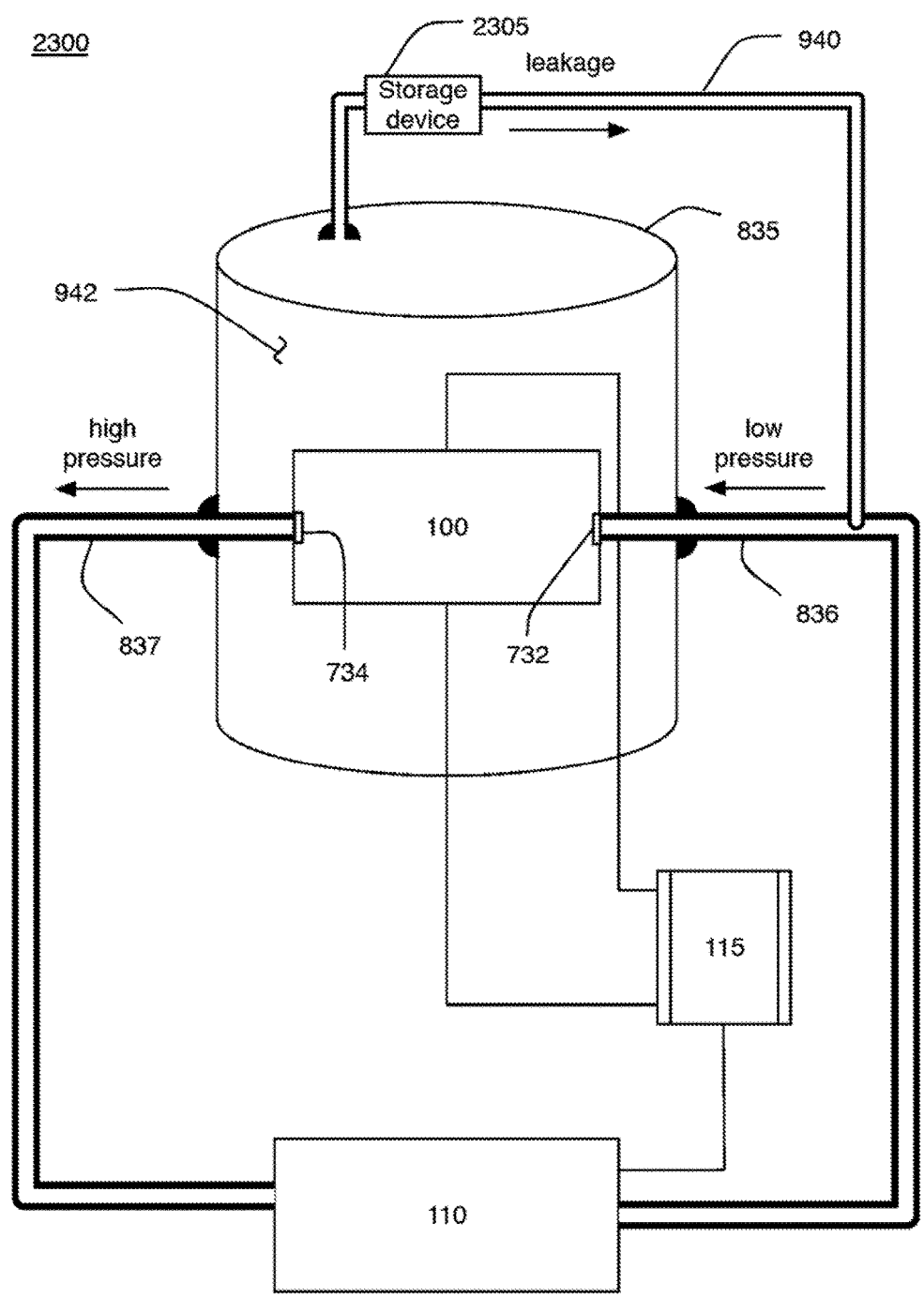

Referring to FIG. 23, another example electrochemical system 2300 is shown. The system 2300 is similar to the system 905 discussed above with respect to FIG. 9A. The system 2300 includes a storage device 2305 that is in fluid communication with the leakage flow conduit 940. The storage device 2305 can be similar to the storage device 1900 discussed above with respect to FIGS. 19A-20. Working fluid that leaks from the compressor 100 enters the conduit 940 and flows into the storage device 2305 through an inlet (not shown). The storage device 2305 stores the electrochemically active component of the working fluid in a sorbtion medium similar to the sorbtion medium 1925 (FIGS. 19B and 19C).

An outlet of the storage device 2305 is fluidly connected to the leakage flow conduit 940. When the stored electrochemically active fluid is released or liberated from the storage device 2305, the released fluid exits the storage device 2305 and flows into the leakage flow conduit 940. The released fluid can then re-enter the inlet conduit 836 and the compressor 100. Thus, the storage device 2305 replenishes the system 2300 using captured leaked working fluid (including the electrochemically active portion). Further, when the system 2300 is a refrigeration system that uses a working fluid that includes an electrochemically active component (such as hydrogen) and a refrigerant, the storage device 2305 can be used to balance the ratio of the component to the refrigerant. For example, when the temperature increases, the refrigerant may evaporate, and the storage device may be used to return less of the captured leaked hydrogen to the conduit 836 to keep a relatively constant ratio of hydrogen to refrigerant.

Figure 24:
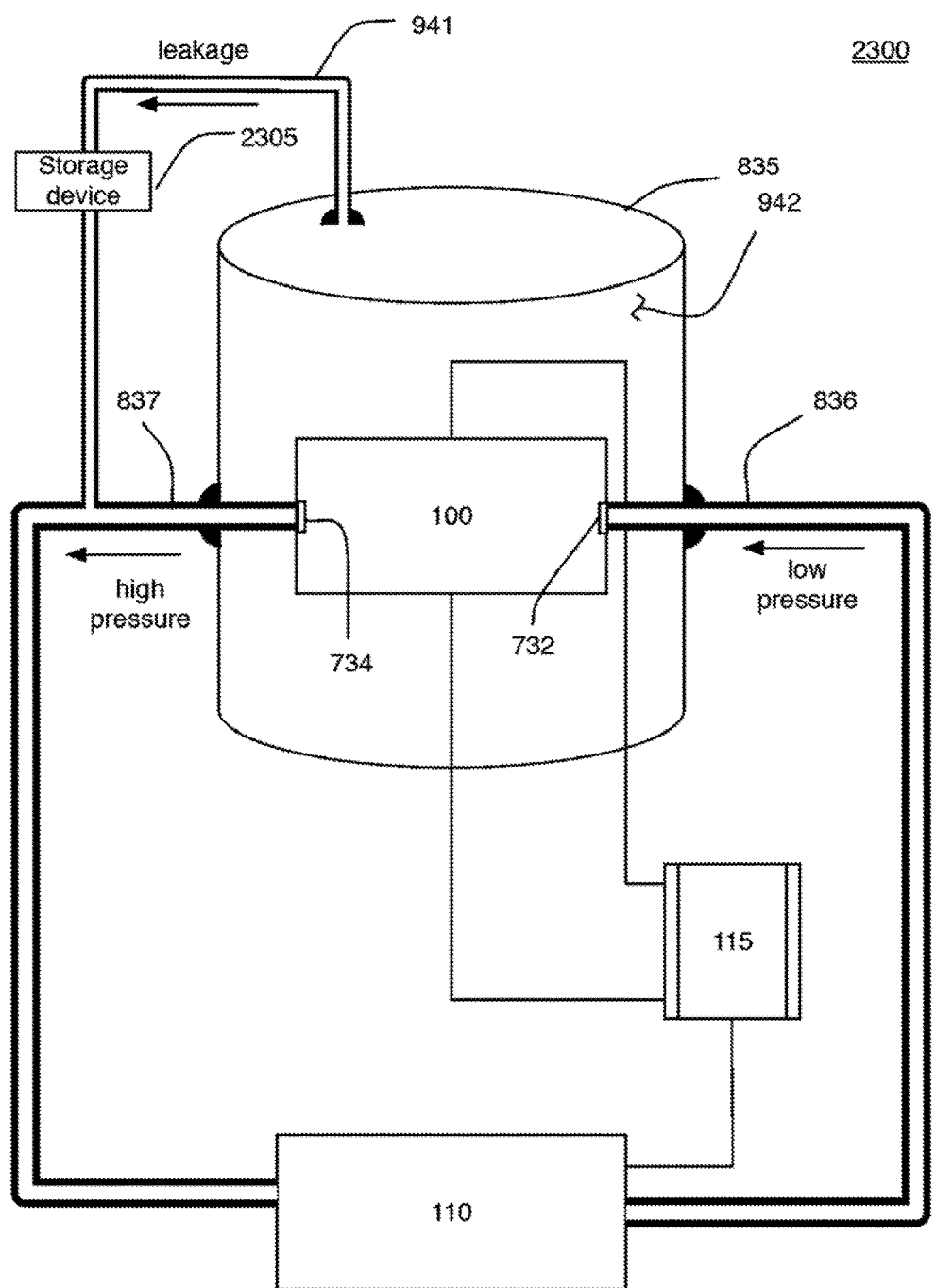

Referring to FIG. 24, the system 2300 is configured with a leakage flow conduit 941 that is connected on a high-pressure side of the compressor 100.

Figure 25:
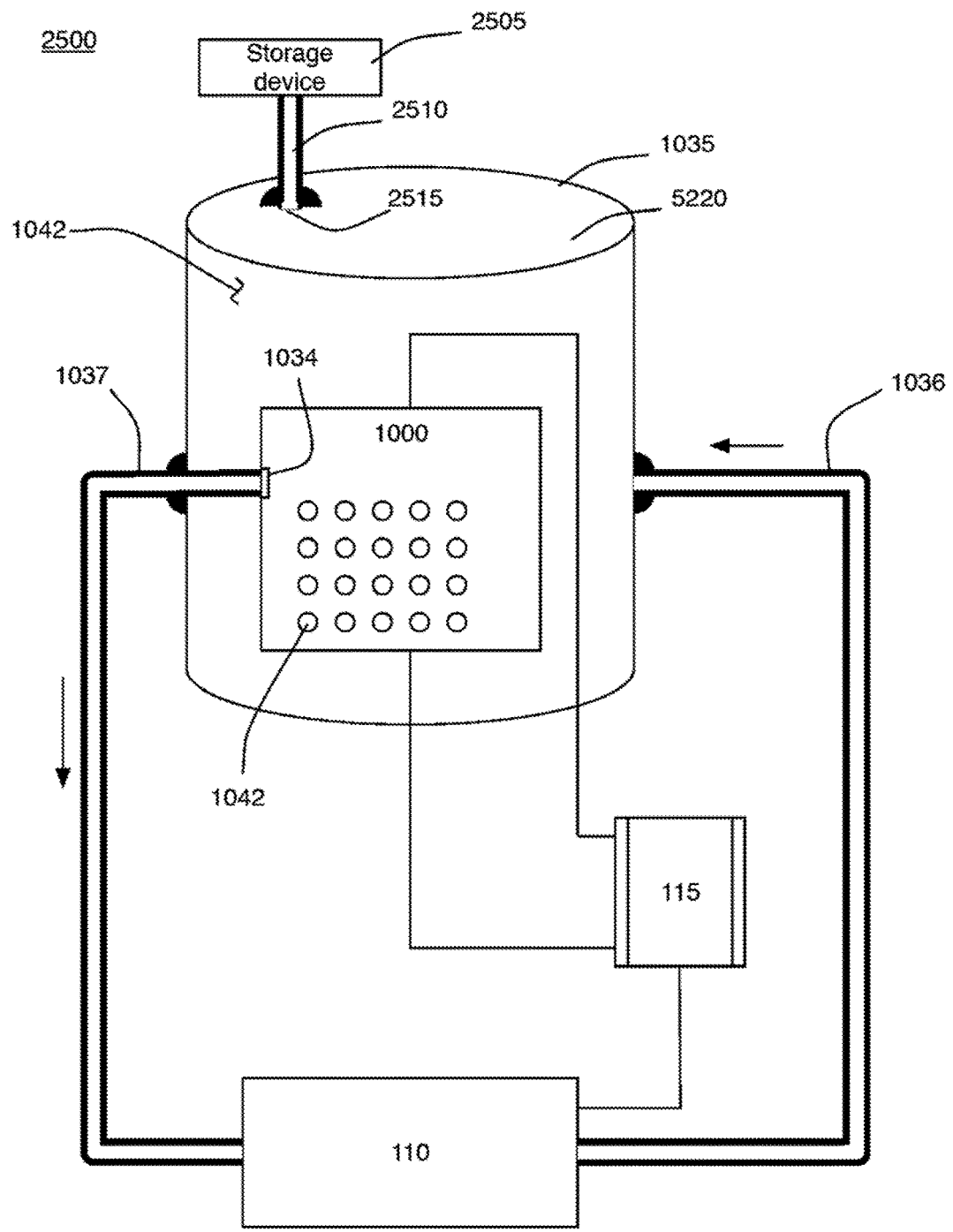

Referring to FIG. 25, a system 2500 is similar to the system 1005 discussed above in FIG. 10A. However, the system 2500 includes an external storage device 2505 that is fluidly connected to a conduit 2510. The conduit 2510 is received in an opening 2515 that is defined in a wall 5220 of the vessel 1035.

The storage device 2505 is external to an interior of the vessel 1035. The storage device 2505 is similar to the storage device 1900. The storage device 2505 receives leaked working fluid from the interior of the vessel 1035. The storage device 2505 stores the electrochemically active component of the working fluid, and the storage device 2505 releases the stored electrochemically active component back into the interior of the vessel 1035 to replenish the fluid that was leaked from the compressor.

Figure 26:
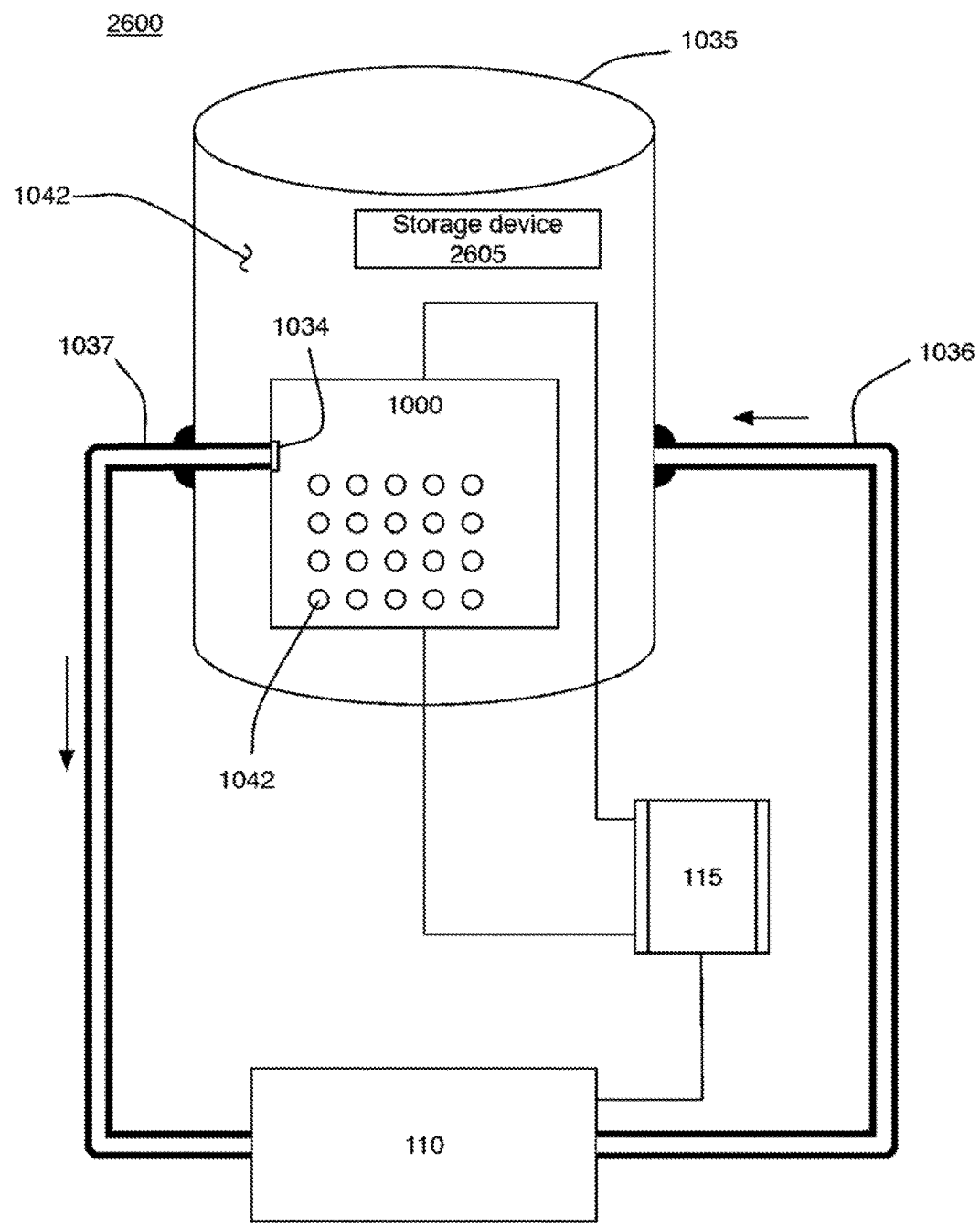

Referring to FIG. 26, a system 2600 is shown. The system 2600 is similar to the system 2500, except the vessel 1035 contains a storage device 2605. Thus, the storage device 2605 is internal instead of external to the vessel 1035. The storage device 2605 can be similar to the storage device 1900.

Other implementations are within the scope of the following claims. For example, the sorbing material 1925 may be a material that dissolves the working fluid, or an electrochemically active component of the working fluid upon contact. In these implementations, the dissolved fluid is stored in the sorbing material 1925 until an external process, such as heating the sorbing material 1925 or changing a pressure that the sorbing material 1925 is exposed to, liberates the dissolved fluid. The example sorbing material 1925 shown in FIG. 19B is cylindrically shaped. However, other shapes can be used. For example, the sorbing material 1925 can be a disk, a cube, or a sphere.

The storage device 1900 can be placed on the interior of a vessel that contains an electrochemical compressor, or the storage device 1900 can be mounted outside of the vessel in fluid communication with the interior of the vessel.

The storage device 1900 can store the electrochemically active component of a working fluid or multiple components of the working fluid.

Other implementations are within the scope of the following claims.

What is claimed is:

1. An electrochemical system comprising:
an electrochemical compressor connected to an electrical energy source and through which a working fluid that includes a component that primarily acts as an electrochemically-active component flows, and comprising:
an inlet;
an outlet;
one or more electrochemical cells, each electrochemical cell comprising:
an anode connected to the electrical energy source,
a cathode connected to the electrical energy source, and
an electrolyte disposed between and in intimate electrical contact with the cathode and the anode to pass the working fluid;
wherein the working fluid at a first pressure is pumped through the electrolyte by an electrical potential across the anode and cathode to produce a working fluid at a second pressure that is at a higher pressure than said first pressure;
an inlet conduit;
an outlet conduit;
a sealed rigid vessel in which the electrochemical compressor is housed comprising:
an inlet opening in the sealed rigid vessel through which the working fluid at a first pressure flows into the sealed rigid vessel from said inlet conduit; and
an outlet opening in the sealed rigid vessel through which the working fluid at a second pressure flows from the outlet of the electrochemical compressor through said outlet conduit;
said inlet conduit extending from an exterior of the sealed rigid vessel through the inlet opening of the sealed rigid vessel for passing said working fluid from outside of the sealed rigid vessel, through said input opening and into the sealed rigid vessel; and
said outlet conduit extending from an exterior of the sealed rigid vessel through the outlet opening of the sealed rigid vessel to the outlet of the electrochemical compressor for passing said working fluid at said second pressure from the electrochemical compressor outlet out of the sealed rigid vessel;
wherein the inlet and the outlet conduit are in fluid communication to create a closed loop for the flow of the working fluid from the outlet of the electrochemical compressor to the inlet of the electrochemical compressor;
wherein a leaked working fluid that leaks from the electrochemical compressor is contained within the sealed rigid vessel;
a storage device in fluid communication with the sealed rigid vessel for storing only the leaked working fluid from the sealed rigid vessel, said storage device comprising:
a housing;
an inlet that receives working fluid from the sealed rigid vessel;
an outlet; and
a sorbtion medium within the storage device configured to store the leaked working fluid as stored working fluid;
a leakage flow conduit comprising:
a first end of the leakage flow conduit coupled to the outlet of the storage device;

a second end of the leakage flow conduit fluidly coupled to the inlet conduit;

wherein the stored working fluid is passed back into the closed loop of the flow of the working fluid from the storage device;

wherein the working fluid that is passed back into the closed loop is pumped through the electrolyte by an electrical potential across the anode and cathode to produce a working fluid at said second pressure that is at a higher pressure than said first pressure.

2. The system of claim 1, wherein the electrolyte comprises a solid electrolyte.

3. The system of claim 1, wherein the electrochemically active component of the working fluid comprises hydrogen.

4. The system of claim 1, further comprising:

a condenser that transfers heat from a first heat reservoir to the working fluid, an evaporator that transfers heat from the working fluid to a second heat reservoir, and an expansion valve between the condenser and the evaporator that reduces pressure of the working fluid, wherein the electrochemical compressor is between the condenser and the evaporator.

5. The electrochemical system of claim 1, wherein only the electrochemically active component of the leaked working fluid collects in the storage device.

6. The electrochemical system of claim 1, wherein the storage device is in fluid communication with the sealed vessel through a conduit that passes through a sealed opening defined by the sealed vessel.

7. The system of claim 1, wherein the outlet opening in the sealed rigid vessel is a sealed outlet opening and wherein the sealed rigid vessel is hermetically-sealed.

8. The system of claim 1, wherein the inlet opening in the sealed rigid vessel is a sealed inlet opening and wherein the sealed rigid vessel is hermetically-sealed.

9. The system of claim 1, wherein the sealed rigid vessel is hermetically-sealed or semi-hermetically sealed.

10. The electrochemical system of claim 1, wherein the electrochemically active component of the working fluid comprises hydrogen and the working fluid further comprises a refrigerant.

11. The electrochemical system of claim 10, wherein the storage device is configured to release the hydrogen stored in the sorbtion medium into the inlet of the electrochemical compressor to balance a ratio of the hydrogen with the refrigerant.

* * * * *